US012269719B2

(12) United States Patent
Schell

(10) Patent No.: US 12,269,719 B2
(45) **Date of Patent: *Apr. 8, 2025**

(54) DUMP SYSTEM

(71) Applicant: Samuel J. Schell, Champion, PA (US)

(72) Inventor: Samuel J. Schell, Champion, PA (US)

( * ) Notice: Subject to any disclaimer, the term of this patent is extended or adjusted under 35 U.S.C. 154(b) by 933 days.

This patent is subject to a terminal disclaimer.

(21) Appl. No.: 17/174,852

(22) Filed: Feb. 12, 2021

(65) Prior Publication Data

US 2022/0259021 A1 Aug. 18, 2022

Related U.S. Application Data

(63) Continuation of application No. 16/422,604, filed on May 24, 2019, now Pat. No. 10,919,696, which is a continuation of application No. 14/392,161, filed as application No. PCT/US2014/044435 on Jun. 26, 2014, now Pat. No. 10,301,111.

(60) Provisional application No. 61/839,511, filed on Jun. 26, 2013.

(51) Int. Cl.
*B66F 9/02* (2006.01)

(52) U.S. Cl.
CPC .................................... *B66F 9/02* (2013.01)

(58) Field of Classification Search
CPC .............................. B66F 9/02; B66F 2203/02
See application file for complete search history.

(56) References Cited

U.S. PATENT DOCUMENTS 1,920,243 A 8/1933 Casper
2,808,947 A 10/1957 Shippy
3,261,486 A 7/1966 Oliver
4,219,298 A 8/1980 Stragier et al.
4,915,570 A 4/1990 Rath et al.
(Continued)

FOREIGN PATENT DOCUMENTS

DE 3828845 A1 3/1990
GB 2418901 A 4/2006

OTHER PUBLICATIONS

Extended European Search Report dated Jan. 12, 2017 in European Patent Application No. 14817150.7.

(Continued)

*Primary Examiner* — Saul Rodriguez
*Assistant Examiner* — Ashley K Romano
(74) *Attorney, Agent, or Firm* — Fox Rothschild LLP

(57) ABSTRACT

A material handling system for lifting and dumping material into a container. Material handling systems for lifting and dumping material into a container are described herein which, in some embodiments, comprise at least one horizontal rail connected to the container, at least one vertical track slidably mounted to the horizontal rail, the vertical track defining a generally vertically extending lower portion and a curved upper portion transitioning into the generally vertically extending lower portion, a holder, the holder being connected to the vertical track in a manner permitting movement between an uppermost position and a lowermost position, and a motive power device operable to raise and lower the container along the vertical track between the uppermost position and the lowermost position, wherein the holder is rotated greater than about 90 degrees in the uppermost position relative to the lowermost position.

17 Claims, 28 Drawing Sheets

(56) References Cited

U.S. PATENT DOCUMENTS

| | | | | |
|---|---|---|---|---|
| 5,007,786 | A | 4/1991 | Bingman | |
| 5,049,026 | A | 9/1991 | Bingman et al. | |
| 5,582,500 | A | 12/1996 | Morris | |
| 10,301,111 | B2 * | 5/2019 | Schell | B65F 3/043 |
| 10,919,696 | B2 * | 2/2021 | Schell | B65F 3/08 |

OTHER PUBLICATIONS

Web pages from http://www.perkinsmfg.com/wp-content/uploads/2015/01/Perkins-Assorted-Cane-Products-Brochure.pdf.
Web pages from http://www.perkinsmfg.com/wp-content/uploads/2015/01/Perkins-AC300-Cane-Lifter-Brochure.pdf.
International Search Report dated Oct. 14, 2014 in International Application No. PCT/US2014/004435.
Indian Office Action dated Jan. 14, 2020 in counterpart Indian Patent Application No. 201617002900.
Chinese Office Action Jul. 1, 2020 in counterpart Chinese Patent Application No. 201810315209.5.
Extended European Search Report dated Nov. 9, 2023 in counterpart European Patent Appl. Ser. No. 23175743.6.

* cited by examiner

DUMP SYSTEM

BACKGROUND

This invention relates to a material handling system for lifting and dumping material into a container, such as a truck, trailer, or other container.

There are numerous situations where lifting and dumping of material is required. For example, in certain landscaping scenarios, debris such as grass clippings, leaves, stumps, etc., must be lifted from generally ground level to a position above the walls of a container, such as a dump truck, trailer, or the like, such that some material may be dumped therein. This lifting and dumping can be time-consuming and can potentially present the risk of back and other bodily injury to an individual. Similar applications involving material which must be lifted above the walls of a container include pick up and removal of construction debris, bulk materials such as sand, gravel, mulch, and the like, and pick up and removal of trash and garbage, etc.

In addition to the physical effort necessary to lift such material to an elevation sufficient to dump it, it may also be necessary to use physical effort to deposit and spread such material evenly in the container into which the material is dumped. This also could pose potential injury to a worker in that the worker may be required to enter the container into which the material is dumped to even the material out.

SUMMARY

Generally, the present invention includes in one embodiment, a material handling system for lifting and dumping material into a container, and includes a generally vertically disposed track system and at least one rail provided generally horizontally on the container for allowing the track system to move along the rail to various portions of the container. A moveable carriage is carried on the track system and is moveable upwardly and downwardly along the track system.

The track system includes at the upper end thereof a curved portion which provides tracks that curve approximately 180°. A motive power device, such as a motor, is provided on the carriage which powers the carriage upwardly along the track system and along the curved portion thereof such that the carriage is substantially inverted over the container. A holder, such as a receptacle or bin, is provided which is attachable to the carriage and which may be elevated by the carriage along the track system such that the holder may also be inverted over the container for dumping the contents of the holder into the container.

Controls are provided which cause the motive power device, after dumping, to automatically reverse the carriage such that it and the holder travel through the curved portion and down the track system to a lowermost position. Moveable foot members are provided on the track system which are forced downwardly as the carriage moves to the lowermost position and are configured such that when one or more of the foot members contacts a surface, such as the ground, the motive power device is deactivated, causing the carriage to come to a stop, thereby presenting the holder for reloading at the lowermost position.

In one aspect, material handling systems for lifting and dumping material into a container are described herein which, in some embodiments, comprise at least one horizontal rail connected to the container, at least one vertical track slidably mounted to the horizontal rail, the vertical track defming a generally vertically extending lower portion and a curved upper portion transitioning into the generally vertically extending lower portion, a holder connected to the vertical track in a manner permitting movement between an uppermost position and a lowermost position, and a motive power device operable to raise and lower the container along the vertical track between the uppermost position and the lowermost position, wherein the holder is generally upright in the lowermost position, and wherein the holder is generally inverted in the uppermost position. In some cases, the holder can be a receptacle. A receptacle can be selected from the group consisting of a bin, a wheel barrel, a cart, a Gaylord, and a dumpster.

In another aspect, methods for lifting and dumping material into a container are described herein which, in some embodiments, comprise slidably mounting at least one vertical track to at least one horizontal rail in a manner permitting bidirectional lateral movement of the vertical track relative to the horizontal rail, the vertical track defming a generally vertically extending lower portion and a curved upper portion, connecting a holder to the vertical track in a manner permitting movement of the container between a lowermost position and an uppermost position, lifting the holder along the vertical track from the lowermost position to the uppermost position with a motive power device, and rotating the holder along the curved upper portion to invert the holder.

In a further aspect, containers for receiving dumped material are described herein which, in some embodiments, comprise a dump box defming a dump bed and a plurality of dump walls extending substantially vertically from the dump bed, at least one horizontal rail disposed on at least one of the dump walls, at least one vertical track slidably mounted to the at least one horizontal rail, the vertical track defming a generally vertically extending lower portion and a curved upper portion, a holder, the container being connected to the vertical track in a manner permitting movement between an uppermost position and a lowermost position, and a motive power device, the motive power device being operable to raise and lower the holder along the vertical track between the uppermost position and the lowermost position, wherein the holder is rotated greater than about 90 degrees in the uppermost position relative to the lowermost position.

BRIEF DESCRIPTION OF THE DRAWINGS

The drawings referenced herein form a part of the specification. Features shown in the drawings are meant as illustrative of some, but not all, embodiments of the invention, unless otherwise explicitly indicated, and implications to the contrary are otherwise not to be made. Although in the drawings like reference numerals correspond to similar, though not necessarily identical, components and/or features, for the sake of brevity, reference numerals or features having a previously described function may not necessarily be described in connection with other drawings in which such components and/or features appear.

DESCRIPTION OF PREFERRED EMBODIMENTS

Figure 1A:
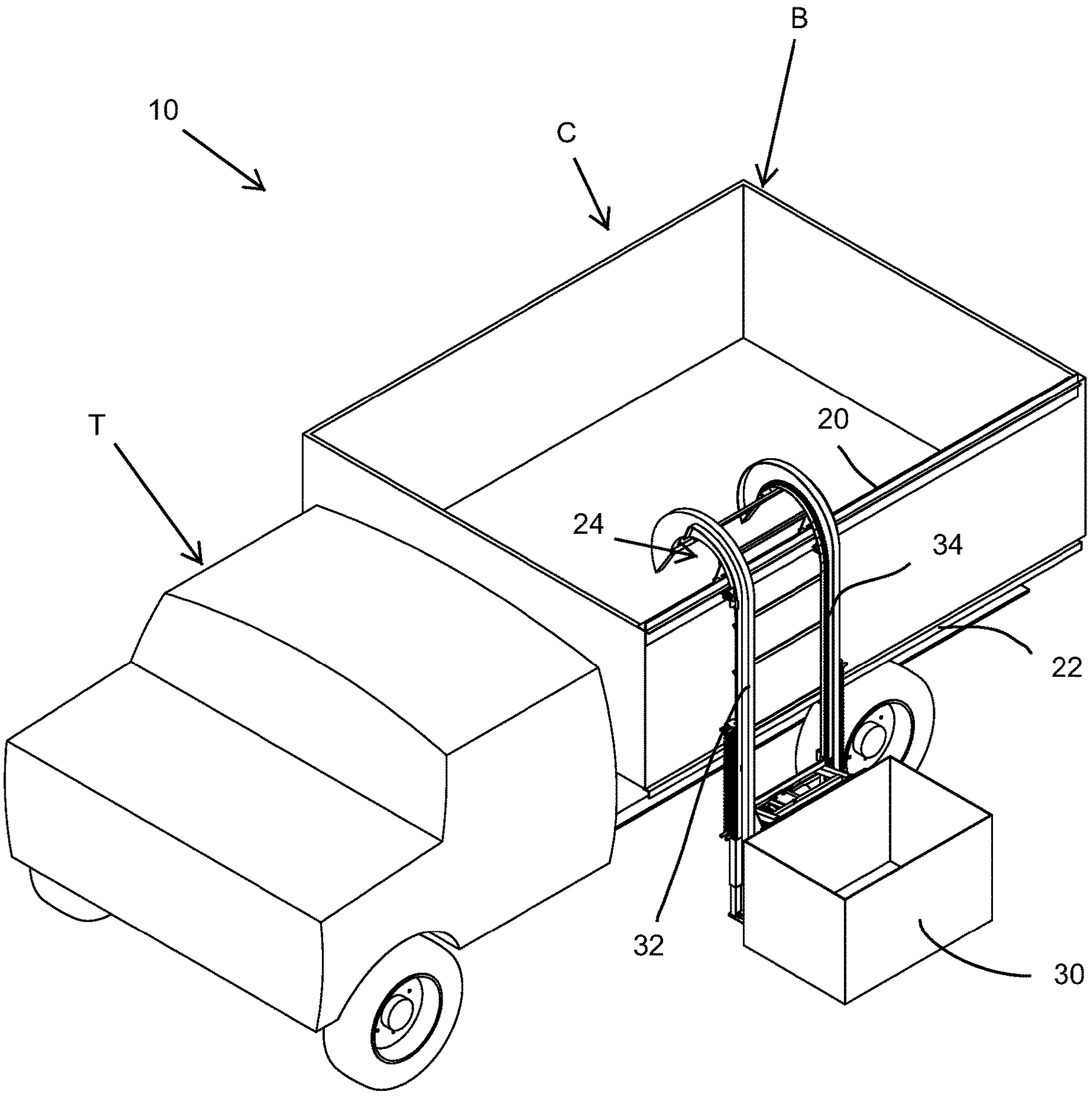
FIGS. 1A-1F are simplified perspective views of one embodiment of a material handling system of the present invention and illustrate a holder being moved upwardly from substantially ground level to a generally inverted position over the opening of a container, namely, a dump truck box.

The accompanying drawings and the description which follows set forth this invention in several of its preferred embodiments. However, it is contemplated that persons generally familiar with material handling systems will be able to apply the novel characteristics of the structures illustrated and described herein in other contexts by modification of certain details. Accordingly, the drawings and description are not to be taken as restrictive on the scope of this invention, but are to be understood as broad and general teachings.

In the following detailed description of exemplary embodiments of the invention, reference is made to the accompanying drawings that form a part hereof, and in which are shown by way of illustration specific exemplary embodiments in which the invention may be practiced. While these embodiments are described in sufficient detail to enable those skilled in the art to practice the invention, it will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other embodiments may be utilized, and logical, mechanical, electrical, electro-optical, software/firmware and other changes may be made without departing from the spirit or scope of the present invention.

Accordingly, the following detailed description is not to be taken in a limiting sense.

In one aspect, material handling systems for lifting and dumping material into a container are described herein which, in some embodiments, comprise at least one horizontal rail connected to the container, at least one vertical track slidably mounted to the horizontal rail, the vertical track defming a generally vertically extending lower portion and a curved upper portion transitioning into the generally vertically extending lower portion, a holder connected to the vertical track in a manner permitting movement between an uppermost position and a lowermost position, and a motive power device operable to raise and lower the container along the vertical track between the uppermost position and the lowermost position, wherein the holder is generally upright in the lowermost position, and wherein the holder is generally inverted in the uppermost position.

For the purposes of the present disclosure, the term "horizontal" generally refers to a configuration or orientation substantially parallel to the ground or to a surface above which the material handling system is to be disposed. For example, horizontal can refer to a position within about 20 degrees of parallel from the ground or surface, within about 10 degrees of parallel from the ground or surface, or within about 5 degrees of parallel from the ground or surface. Further, for the purposes of the present disclosure, the term "vertical" generally refers to a configuration or orientation substantially perpendicular to the ground or a surface above which the material handling system is to be disposed. The term "vertical" can also refer to a position substantially perpendicular to a horizontal position, configuration or orientation. For example, vertical can refer to a position within about 20 degrees of perpendicular from the ground or surface, within about 10 degrees from perpendicular with the ground or surface, or within about 5 degrees of perpendicular with the ground or surface. Further, vertical can refer to a position within about 20 degrees of perpendicular from a horizontal position, configuration or orientation, within about 10 degrees from perpendicular from a horizontal position, configuration or orientation, or within about 5 degrees of perpendicular from a horizontal position, configuration or orientation.

As shown in the drawings, the material handling system of the present invention, generally 10, includes, in one embodiment, various assemblies, subassemblies, and components, which together provide a system for collecting material, such as yard waste, construction debris, bulk materials, trash and garbage, etc., at or near ground level, and elevate such materials to a position above a container, generally C, such as a truck, trailer, or the like, and then substantially invert such materials such that they are ultimately deposited in such container.

Turning to FIG. 1A, one embodiment of the present invention is illustrated for use in connection with a truck, generally T, having a container C, namely a dump bed or box, generally B. Provided along the side of one or more walls of dump box B are upper and lower rails, generally 20, 22, on which a track system, generally 24, may move to and fro in a bidirectional lateral movement. Movement of track system 24 along rails 20, 22 can be accomplished manually, or could be accomplished by a motive power device such as a motor (not shown). Attached to track system 24 is a holder, such as a bin, generally 30, or other receptacle, which moves from a lower portion of track system 24 upwardly along track member tracks or rails, generally 32, 34, to an upper or uppermost position, and then continues onwardly in a generally downward direction, while simultaneously pivoting such that bin 30 is ultimately in a generally inverted configuration. In some embodiments, a generally inverted configuration refers to rotation greater than about 90 degrees in the uppermost position relative to the lower or lowermost position, rotation greater than about 120 degrees in the uppermost position relative to the lowermost position, or rotation of about 180 degrees in the uppermost position relative to the lowermost position.

Tracks 32, 34 of track system 24 includes curved upper portions 36 at the upper section thereof upon which holder or bin 30 rides as it moves from the generally vertically extending lower position to the generally inverted position. Track members 32, 34 thus have the general appearance of inverted "Js", or, perhaps more clearly, they have the general appearance of candy canes or shepherd's crooks.

After moving to the generally inverted position, the movement of holder or bin 30 automatically reverses and returns along the tracks generally 30, of track members 32, 34 downwardly to the lowermost position to again be reloaded with material to ultimately be dumped within box B of truck T.

Figure 1B:
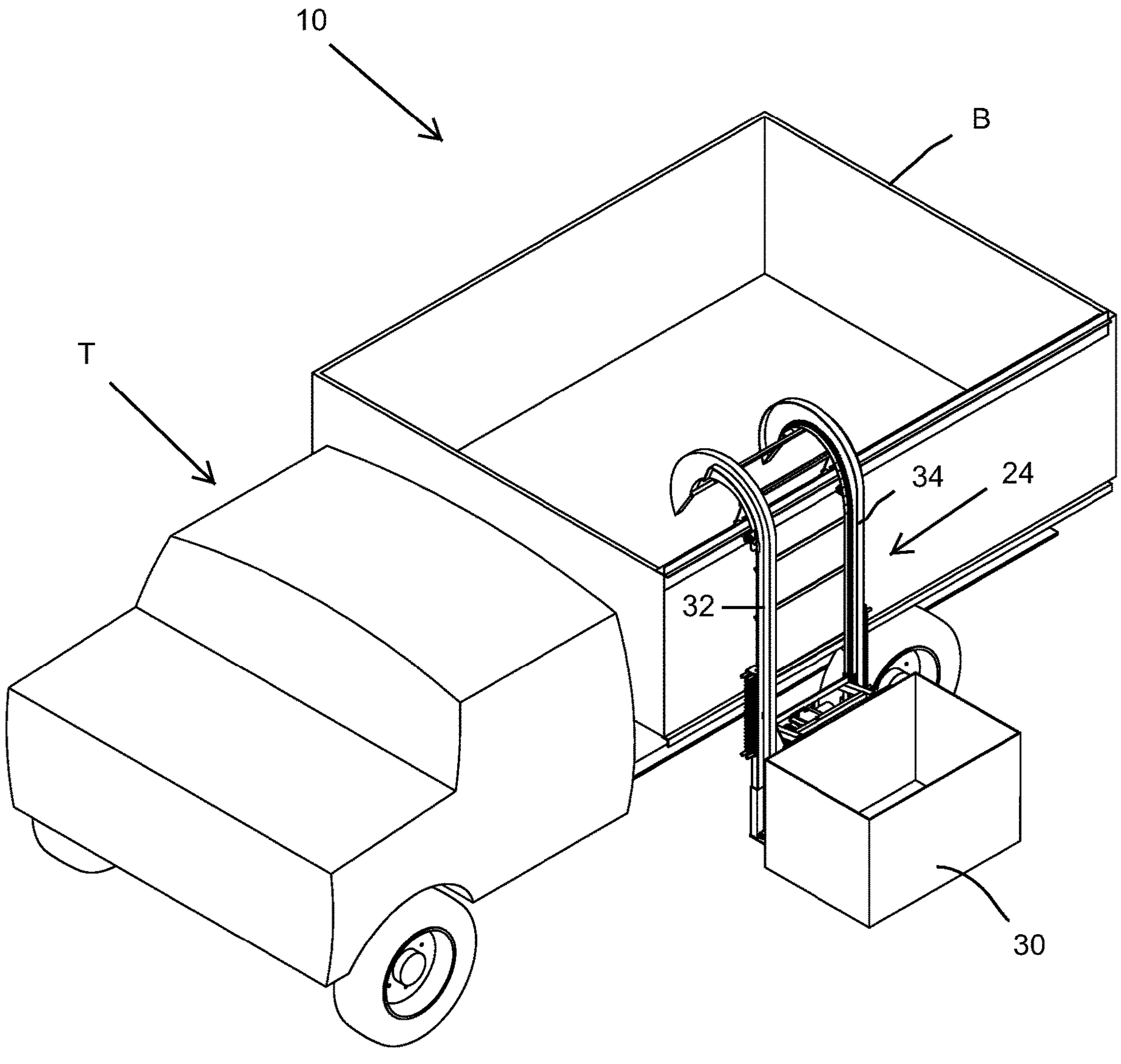

Turning to FIG. 1B, bin 30 is shown having moved upward slightly from the lowermost position shown in FIG. 1A.

Figure 1C:
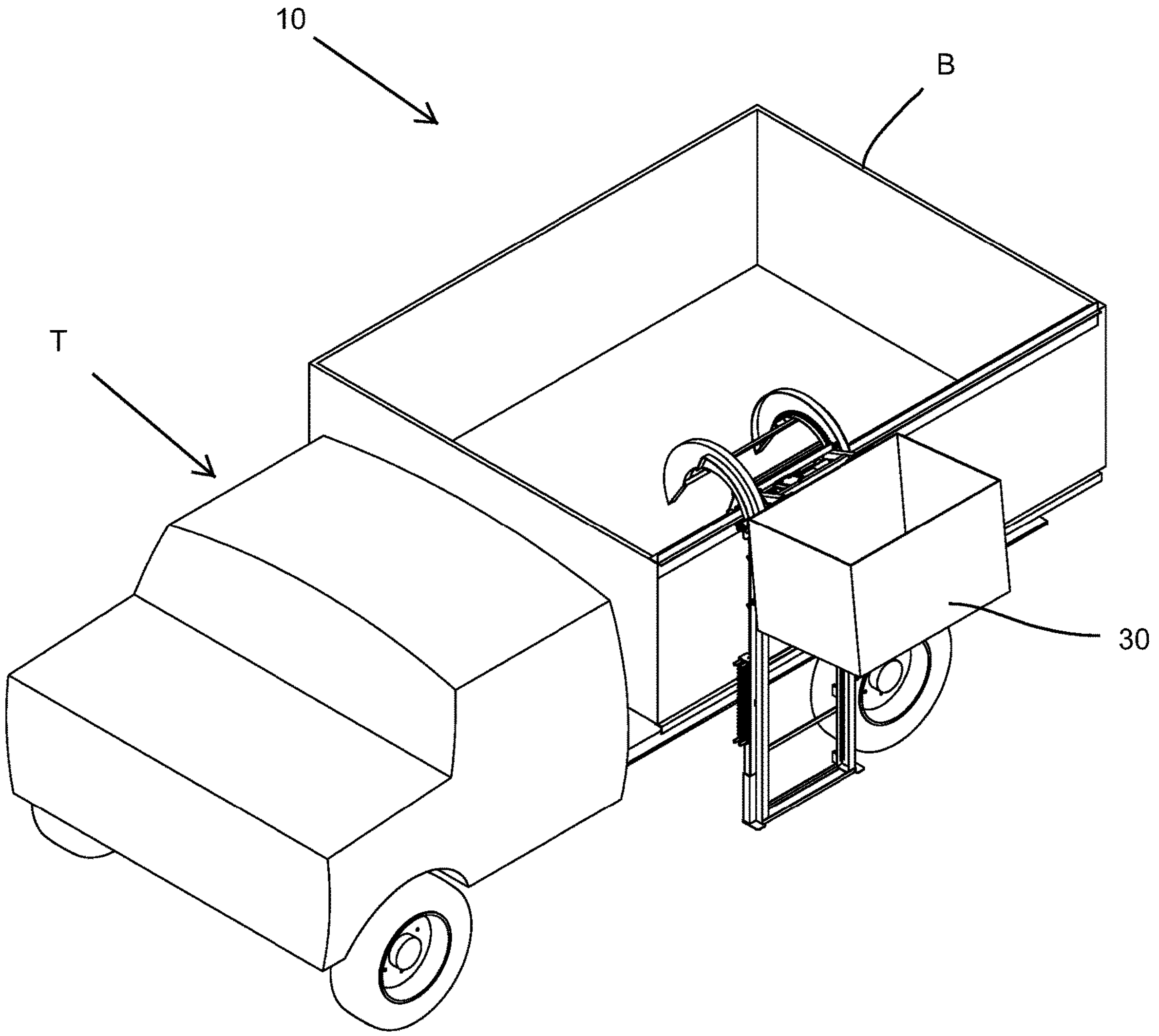
Figure 1D:
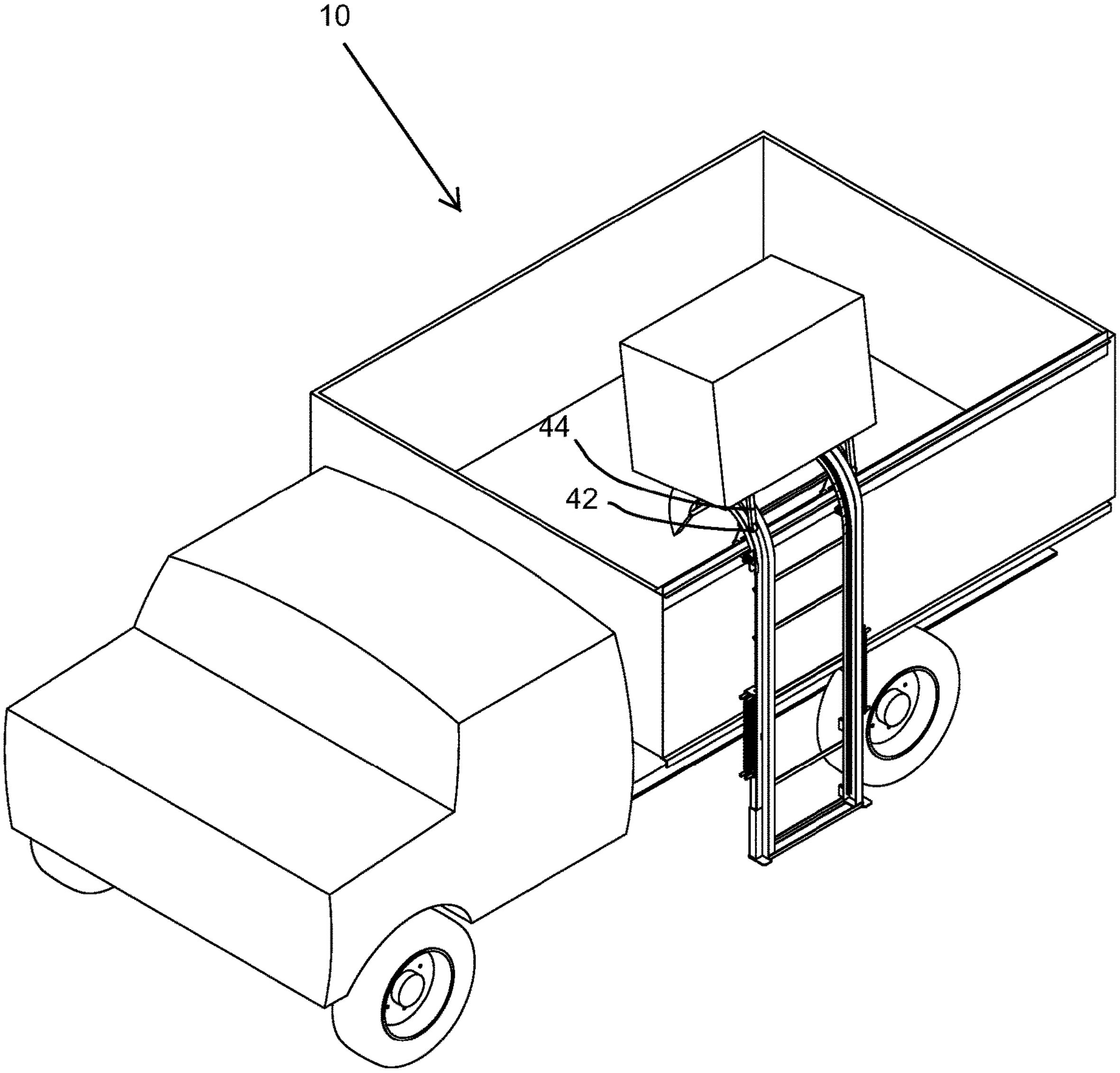
Figure 1E:
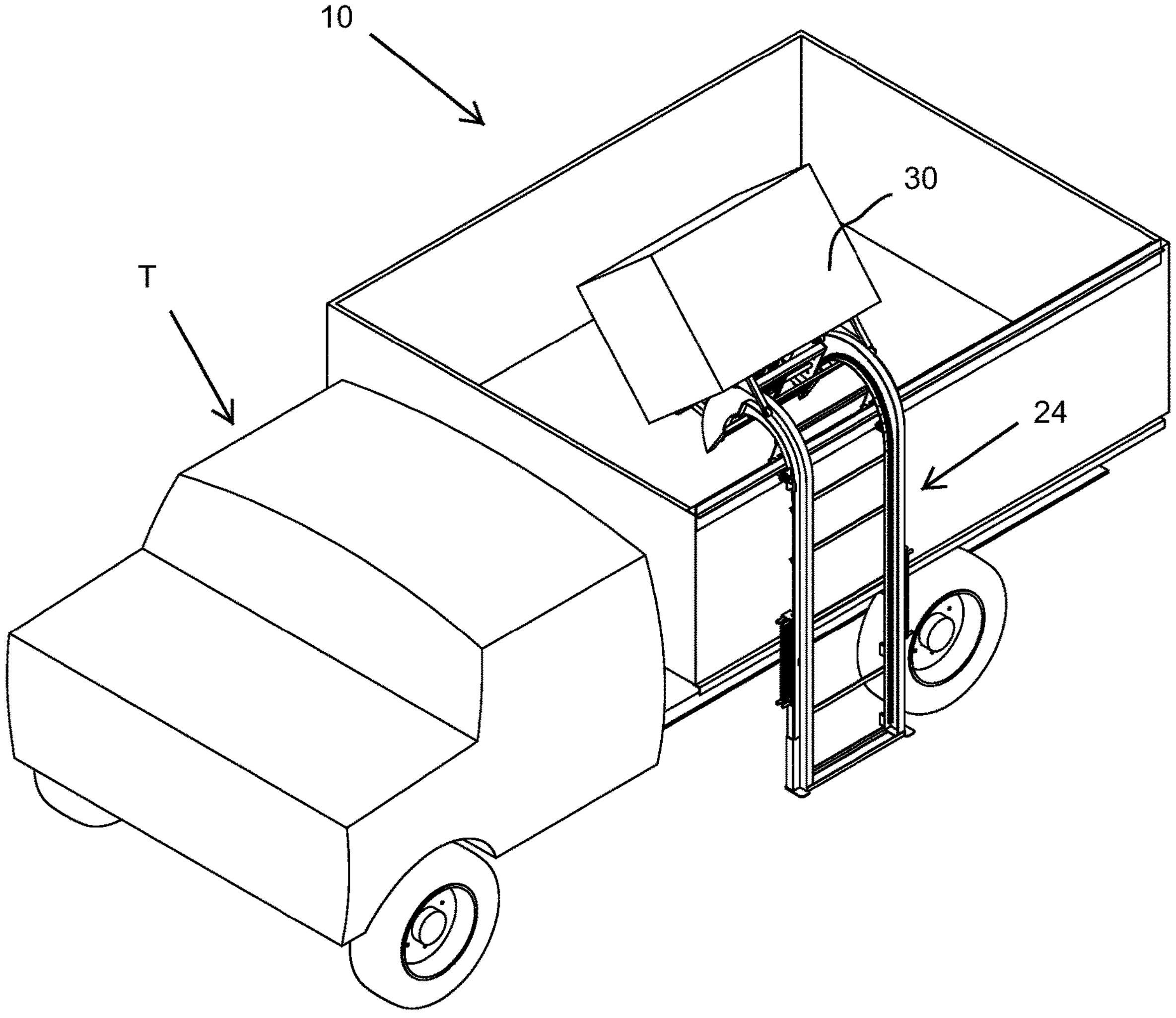
Figure 1F:
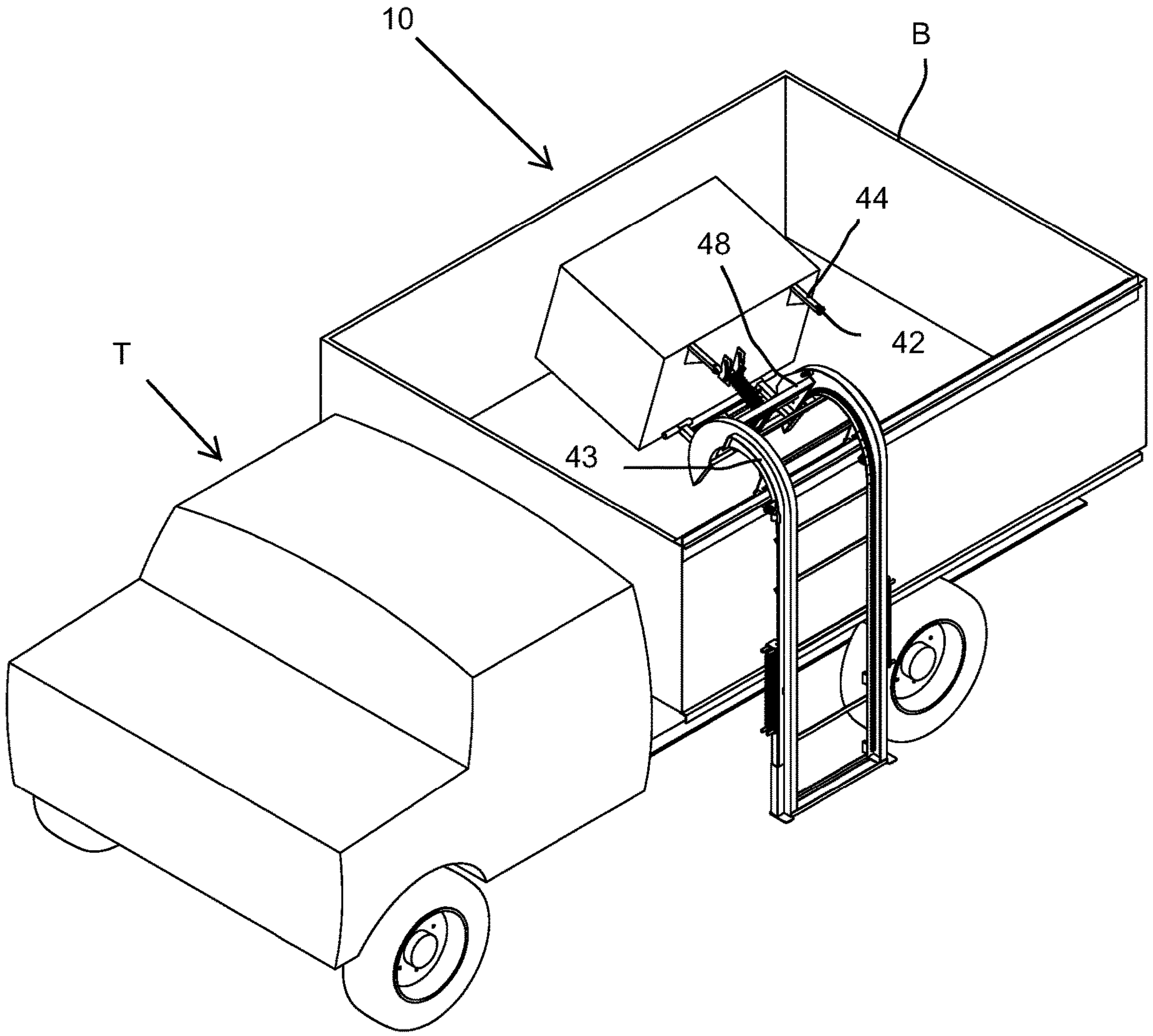
Figure 2:
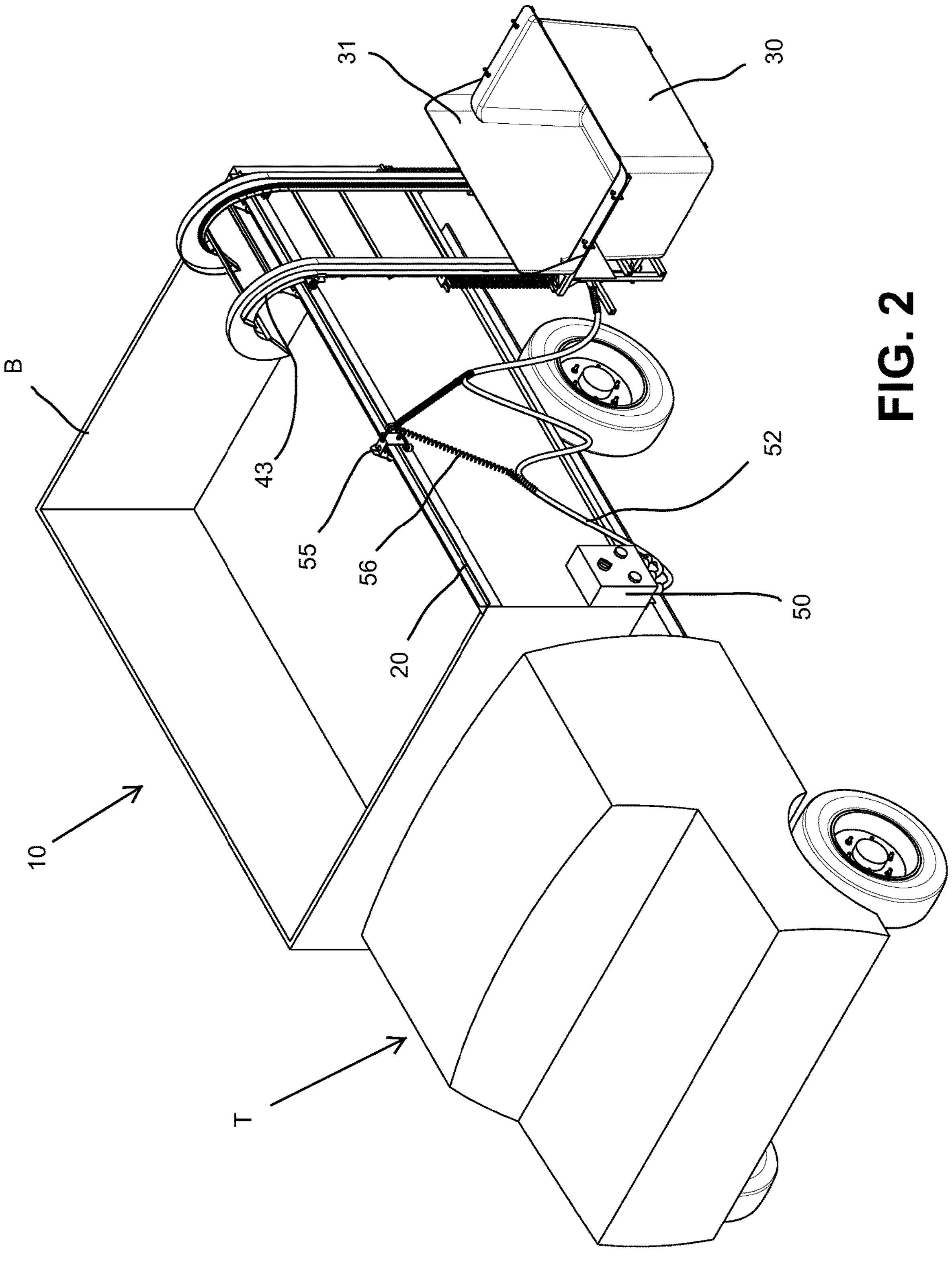
FIG. 2 is a perspective view of another embodiment of the present invention having a holder, namely, a bin, with a chute.

FIG. 1C illustrates bin 30 having moved up track system 24 to a position approximately at the elevation of the top of the box B, and FIG. 1D shows bin 30 at a roughly one hundred eighty degree angle as compared to its relative position when in its lowermost position. Note in particular rollers 42 which are connected to arms 44 and which ride on exterior tracks 43 as bin 30 moves along track system 24. Arms 44 are pivotally connected to a carriage 48 (FIG. 1F) discussed in detail below. At this position, the motive power (discussed below) provided by a motive power device (not shown in FIG. 1) which moves carriage 48 along track system 24 is activated to reverse the motion of bin 30 to move bin 30 towards its lowermost, or "home" position. This return movement of carriage 48 and bin 30 from the generally inverted position towards the home position can be accomplished by an operator activating a control, such as on control box or pendant, generally 50 as shown in FIG. 2 and/or could occur automatically. Carriage 48 can contact an electronic and/or electromechanical limit switch, or upon being within a predetermined distance of a proximity switch or sensor, or through use of some other switching mechanism, such as a light barrier type arrangement, wherein upon bin and/or carriage 48 breaking such light barrier, an electrical signal would be sent to reverse the direction of movement of carriage 48.

FIG. 2 illustrates several additional components not shown in the simplified views of FIGS. 1A through 1F. For instance, control box 50 is shown having a power and/or control cable 52 connected to an electric and/or hydraulic motor 54 (FIG. 4) attached to carriage 48. Cable 52 moves with carriage 48 as carriage 48 moves between the lower or lowermost position and the uppermost or dumping position. A cable hanger 55, which could include an elongated coil spring 56, is connected to cable 52 and keeps cable 52 suspended above the ground as carriage 48 and bin 30 move along track system 24. Control box 50 may include controls for operating motor 54 of carriage 48 and may include an emergency power shutoff, a control to initiate movement of bin 30 (shown in FIG. 2 with a chute extension 31) upwardly, a control to initiate movement of bin 30 in reverse, downwardly on tracks system 24, a control for varying the speed of movement of carriage 48, etc.

Figure 3A:
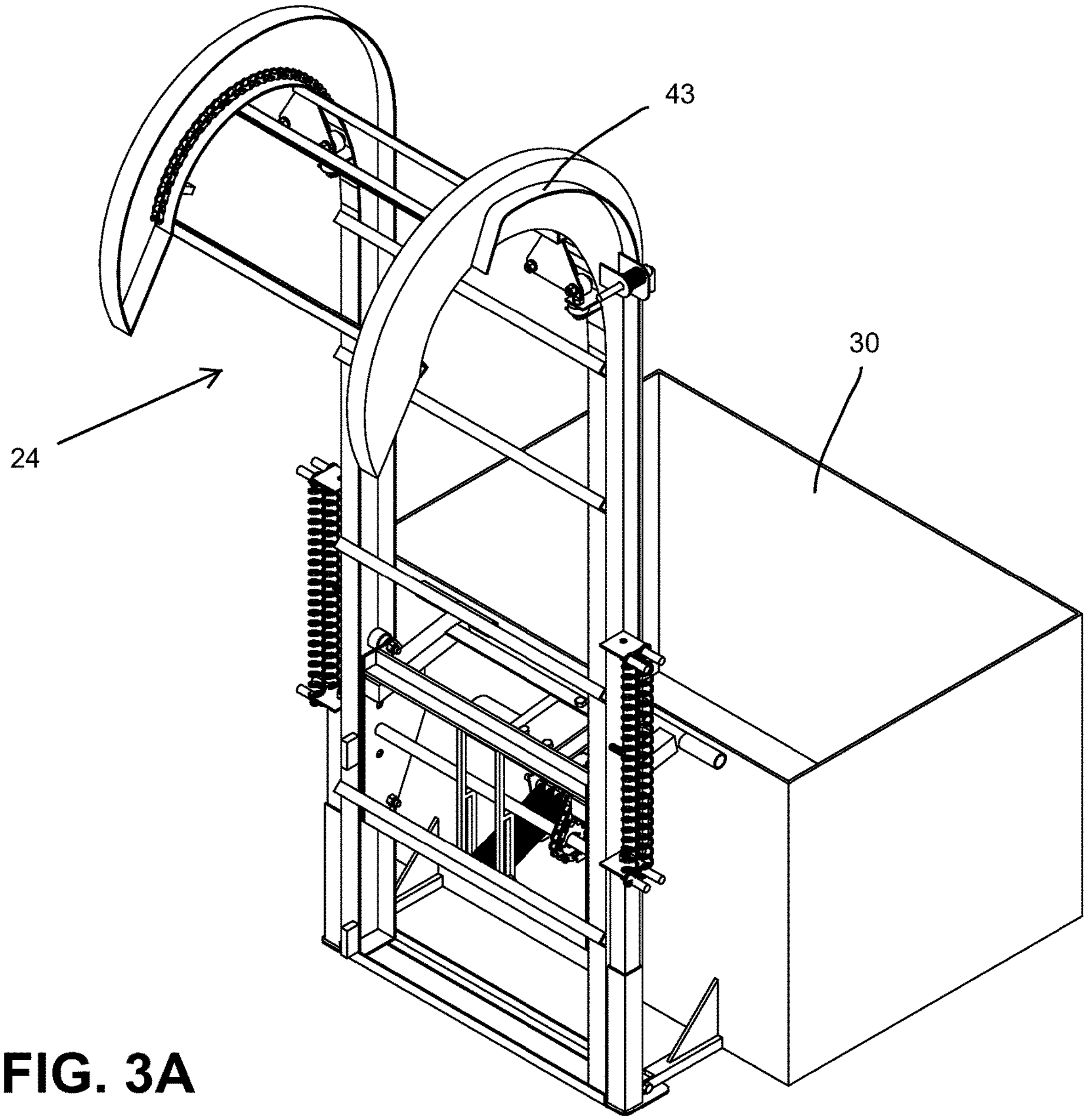
FIGS. 3A through 3E are perspective views of an assembly of a material handling system of the present invention and illustrate a sequence of movement showing a holder originating in a starting position, being lifted upwardly, and then generally inverted.
Figure 3B:
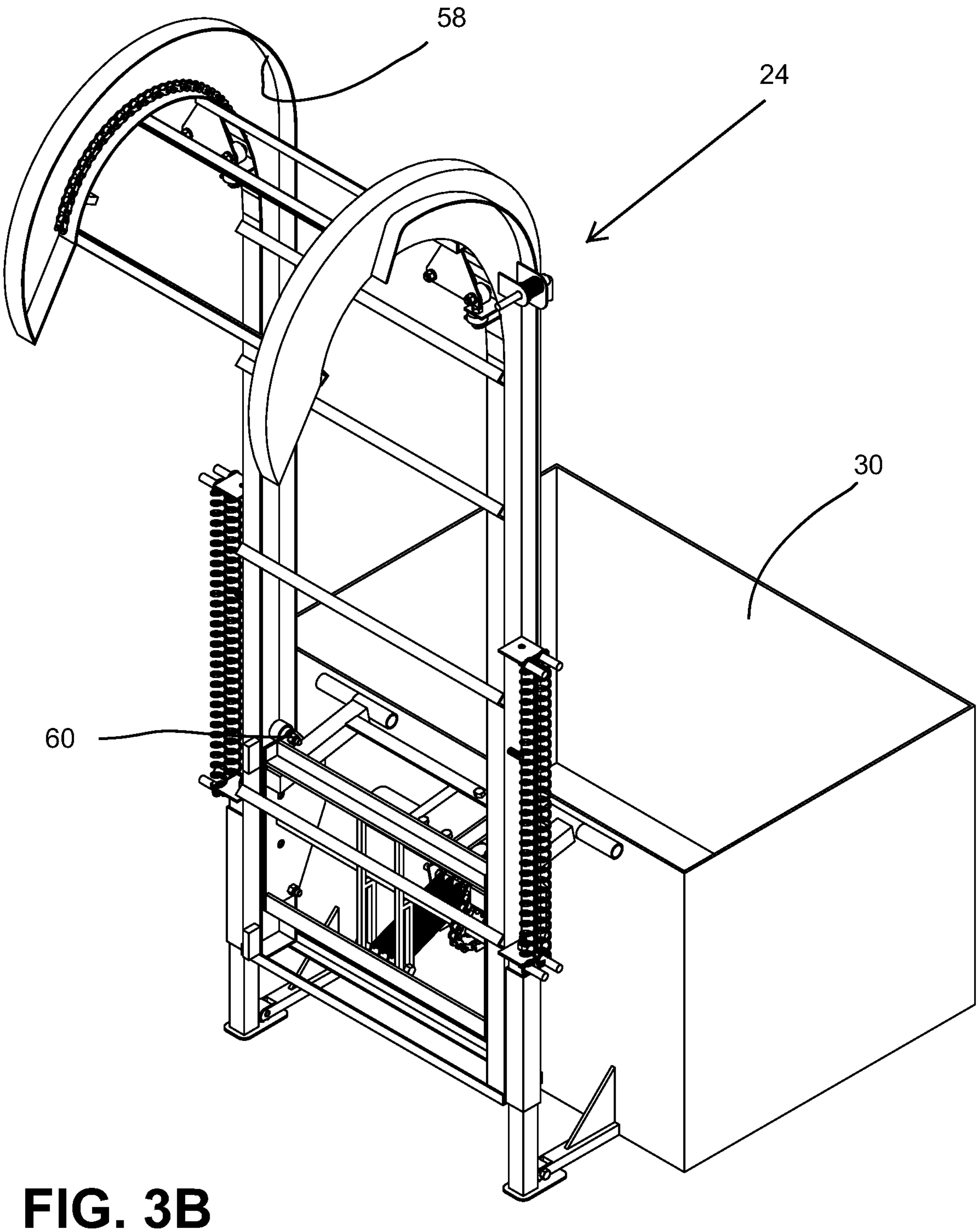

Turning to FIGS. 3B through 3F, various positions of bin 30 are shown as it moves between the lowermost position and the uppermost or dumping position. As shown in FIG. 3B, track system 24 includes two spaced apart track members 32, 34 as noted above. Each track member 32, 34 includes a track 58 which receives upper rollers **60*a* and lower rollers 60*b* of carriage 48**.

Figure 4A:
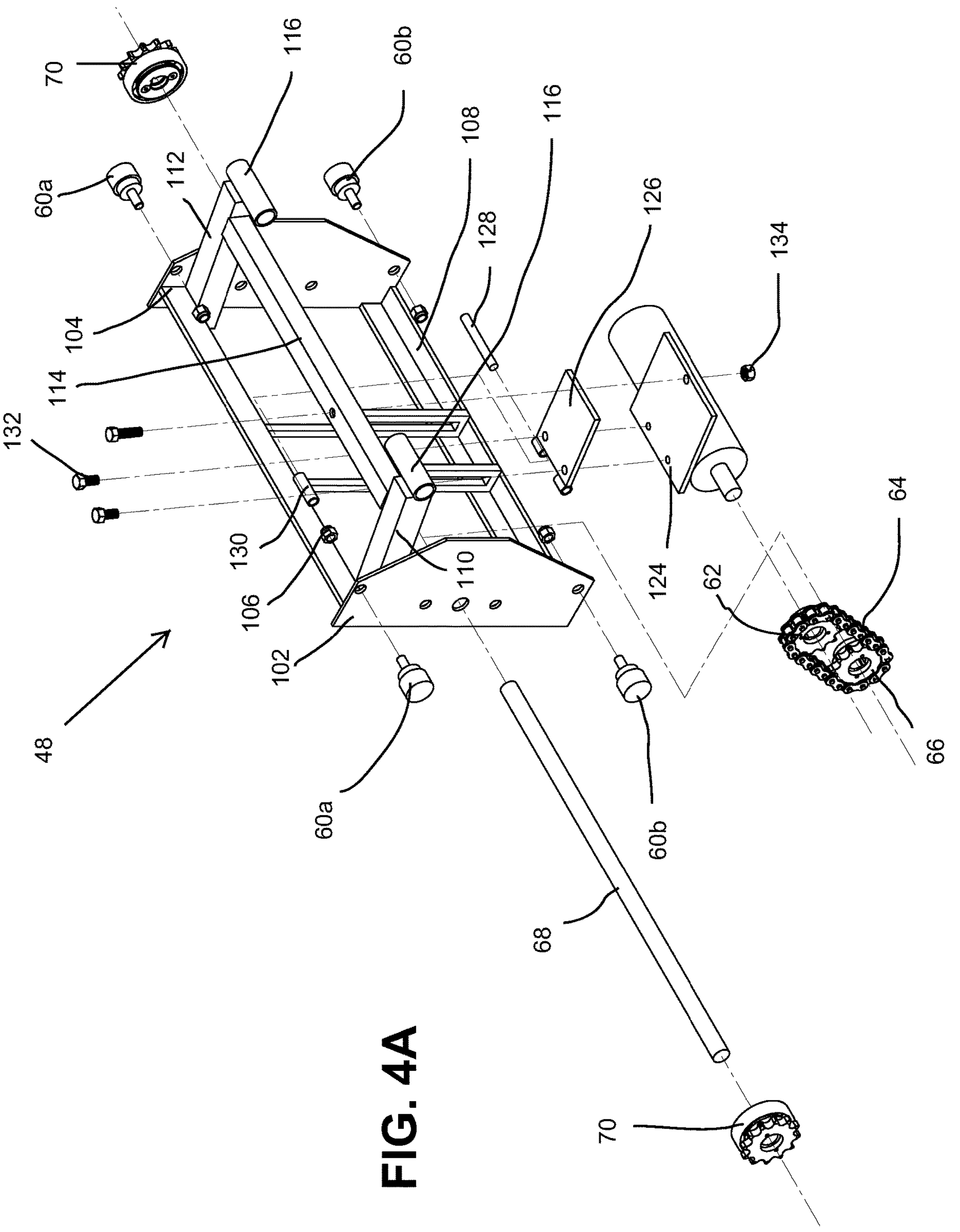
FIG. 4A is an exploded view of a carriage assembly used in one embodiment of the present invention.
Figure 4B:
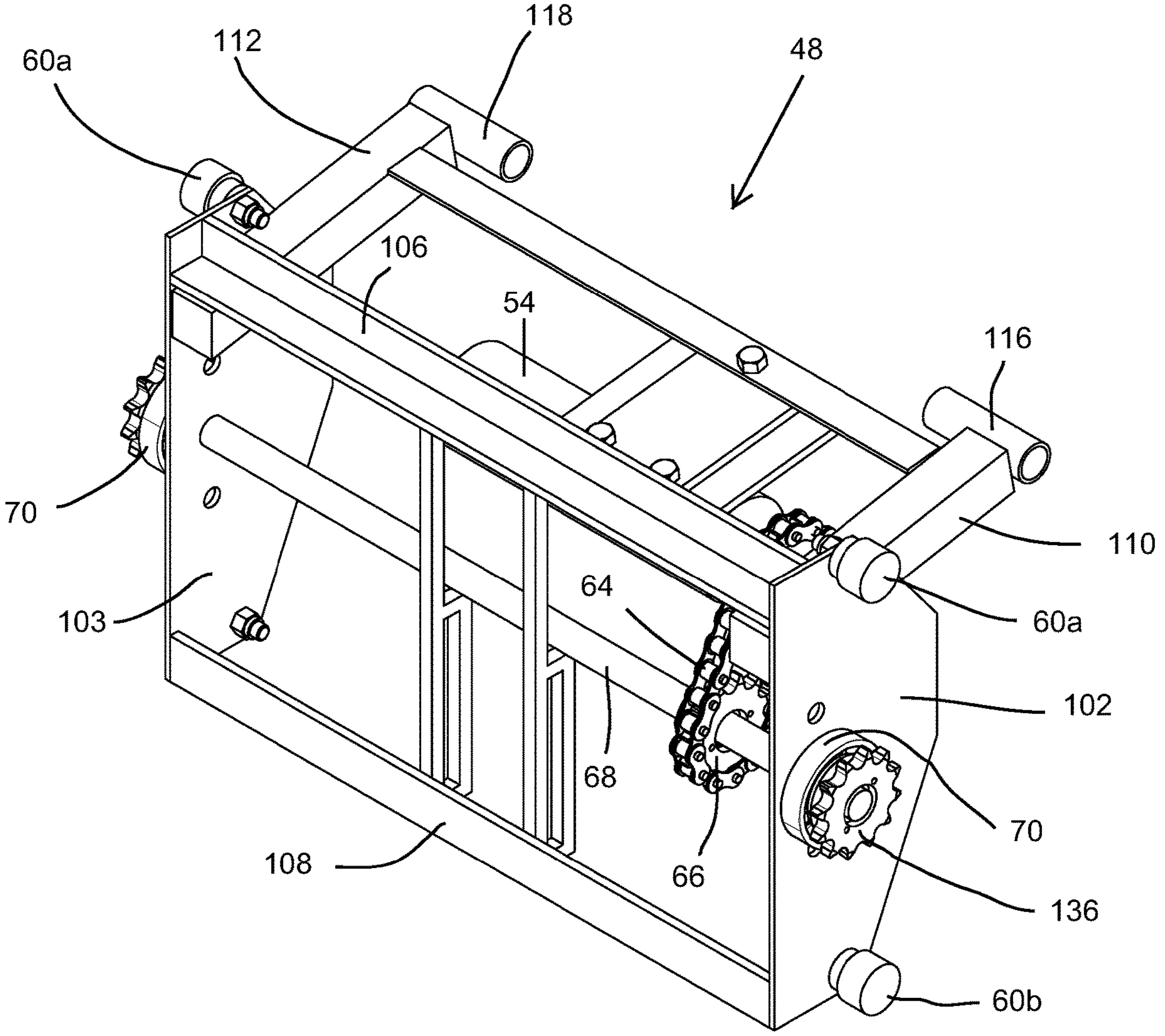
FIG. 4B is a perspective view of a carriage assembly used in one embodiment of the present invention.

As shown in FIG. 4, carriage 48 includes motor 54 having an output sprocket 62 which, via a chain 64, turns a drive sprocket 66 which is connected to a shaft 68. As shown in FIGS. 4A and 4B, at each end of shaft 68 is a bearing and sprocket assembly 70, which engages a length of drive chain 72 (FIG. 3F) fixed in each rail 32, 34 of track system 24. Such length of chain 72, by being fixedly attached to each rail, causes upon engagement of rotating bearing and sprocket assemblies 70 therewith, carriage 48 to move upwardly and downwardly along rails 32, 34 of track system 24.

Figure 3C:
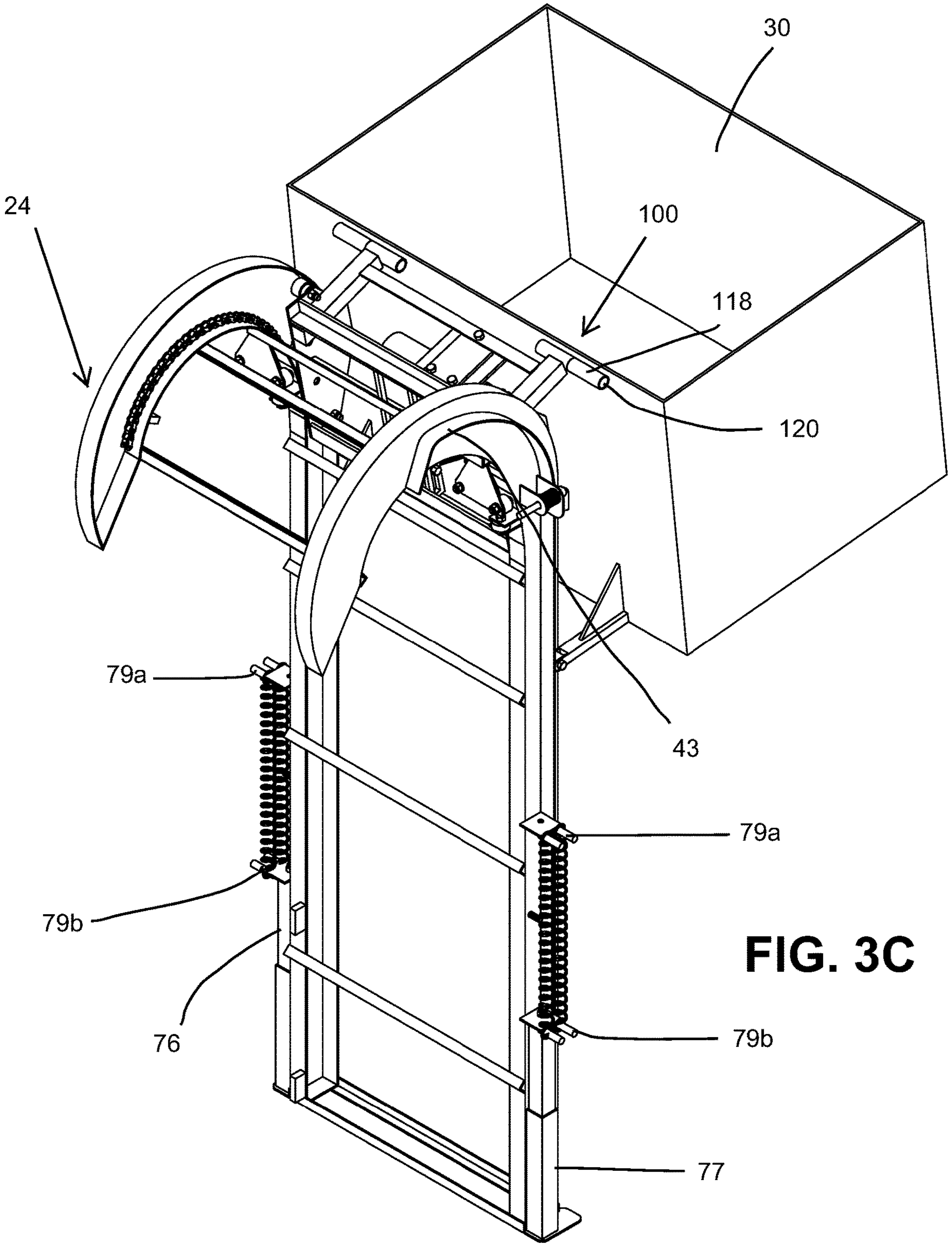

As shown in FIG. 3C, attached to a lower portion of each rail is a movable foot member 76. A foot member 76 is slidingly connected via a channel member 77 to each rail and is biased upwardly by springs 78 connected to the rails by connections **79*a* and to the foot member 76 by connector 79*b*. Springs 78 could be, for example, coil springs 78 as shown in the figures. Each foot member 76 includes a flange 80 against which rollers 42 and/or arms 44 of bin 30 contact as bin 30 moves to the lowermost position. Once such contact is made, foot members 76 extend downwardly until bin 30 contacts the ground or some surface. Foot members 76 have roller contact surfaces contacted by roller 42 as bin 30 moves upwardly from the lowermost position, and such foot members move correspondingly upwardly with bin 30 under the spring tension of springs 78 until they reach their uppermost position. Once feet 76 contact the ground, electrical switch, such as a limit switch, proximity switch, light barrier switch, or the like (not shown), is activated to stop the motive power device, such as a motor 54. At this point, rollers 42 of arms 44 continue to contact roller contact surfaces 58 of each rail 32, 34 of track system 24. FIG. 3A shows foot members 76 at their generally lowermost position, while FIG. 3B shows foot members 76 at their uppermost position, as bin 30 has moved upwardly slightly in FIG. 3B with respect to FIG. 3**A.

FIG. 3C illustrates bin 30 having been raised to an elevated position by carriage 48, powered by motor 54 rotating drive sprocket/bearings 70, and engagement thereof with chains 72. At this point, rollers 84 may still engage roller contact surfaces 58 of rails 32, 34.

Figure 3D:
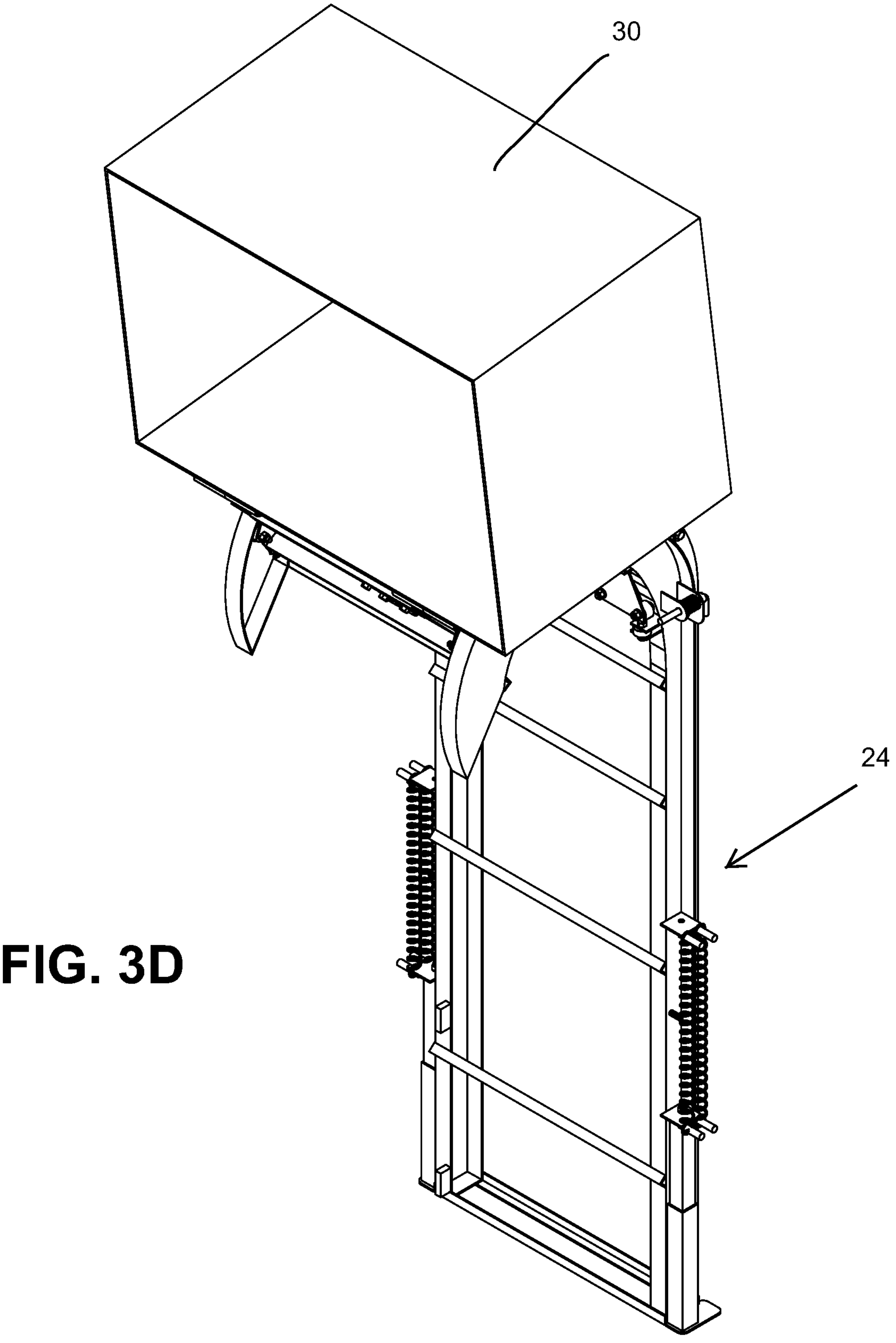
Figure 3E:
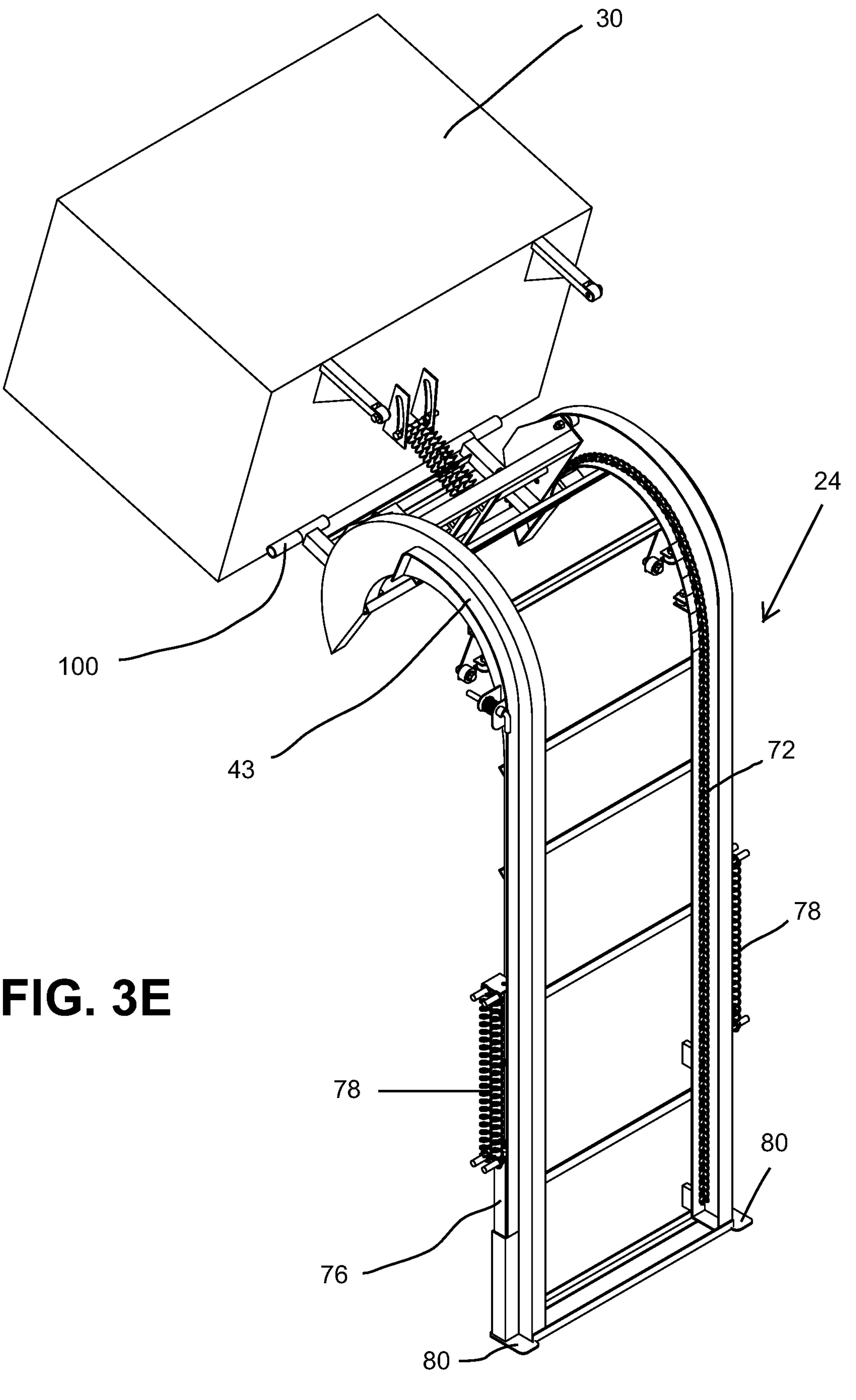

FIG. 3D illustrates carriage 48 at approximately the apex of the curved portions of rails 32, 36. Bin 30 is generally laying on it side, i.e., at a position generally ninety degrees from its lowermost position. Also at this time, because of bin 30 being pivoted on its side, rollers 42 have become disengaged altogether with contact surfaces 58 of rails 32, 34.

FIG. 3F illustrates bin 30 at its generally inverted, dumping position. In this position, it is noted that bin 30 is hinged outwardly away from carriage 48 and that rollers 84 are totally disengaged from rails 32, 34. Also, springs 90 (FIG. 9B), which could be coil springs as illustrated in FIG. 3F, restrain bin 30 from pivoting too far forwardly in going beyond its inverted position. In other words, springs 90 serve to retain the bottom of bin 30 connected with carriage 48. A pin or slider 92 may be connected to the extreme ends of springs 90, and such pin or slider 92 may be carried in curved slots 94 provided in flanges 96 attached to the bottom of bin 30 to facilitate pivoting of bin 30 while still connecting bin 30 to carriage 48. Hinges 100 connect bin 30 to carriage 48 to facilitate pivoting of bin 30 with respect to carriage 48 as bin 30 moves between its lower most position and its dumping position.

Turning again to FIG. 4, carriage 48 includes a framework having end plates 102, 104, and transverse members 106, 108 extending therebetween. Rollers 60 are connected for rotation to end plates 102 and 104. Lateral members 110 and 112 extend outwardly from transverse member 106, and a transverse member 114 extends between lateral members 110, 112. Lateral members 110, 112 have at each end a hinge members 116, which can be in the form of sleeve, which engages with a second hinge members 118 attached to bin 30, which may include a hinge pin 120 (FIG. 3C).

Motor 54 includes a mounting plate 124 which attaches to a hinge plate 126 and which is pivotally attached to carriage 48 via a hinge pin 128 and hinge sleeve 130. Bolts 132 attach motor 54 to plate 126 and are secured using nuts 134. In this arrangement, motor 54 is allowed to pivot about carriage 48 as carriage 48 moves between the lower-most and inverted positions in order to keep sprocket 136 in driving contact with chain 72. Instead of using a sprocket 136 and chain 72, if desired, sprocket 136 could be replaced with a gear (not shown), and chain 72 replaced with straight length of gear teeth, rack, etc. (not shown) for interacting with such gear.

Figure 5:
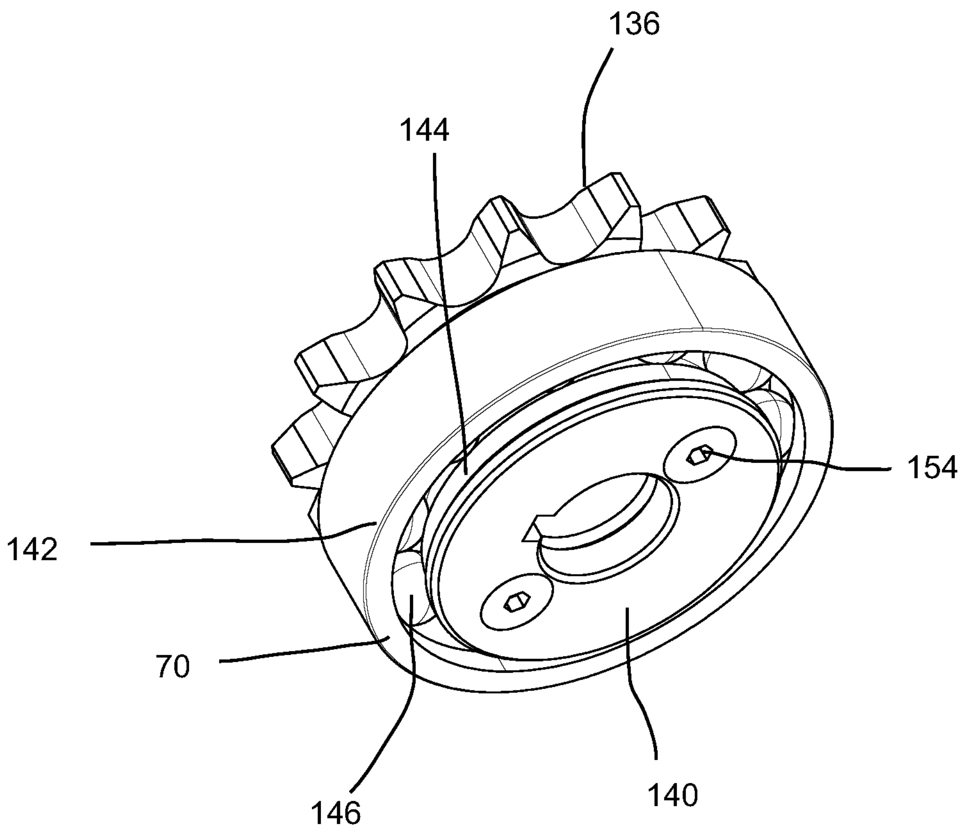
FIG. 5 is a perspective view of a bearing and sprocket subassembly used in one embodiment of the present invention.
Figure 6:
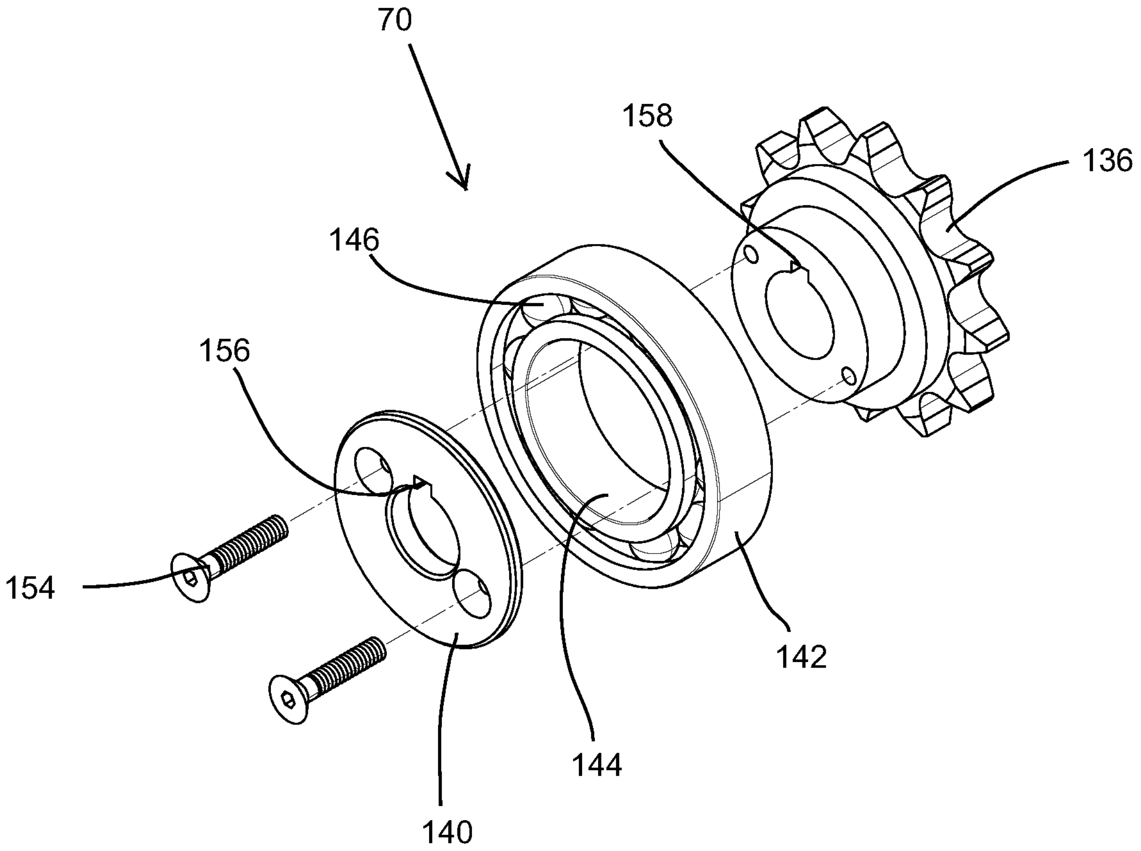
FIG. 6 is an exploded view of the bearing and sprocket subassembly shown in FIG. 5.

FIGS. 5 and 6 illustrate sprocket assembly 70 as including an end plate 140, which is keyed to shaft 68, and an outer bearing race 142 spaced radially outward therefrom. Disposed in between race 142 and plate 140 and a cylindrical inner bearing race 144 are ball bearings 146. Sprocket 136 is fixedly attached to plate 140 using bolts or screws 154, such that sprocket 136 will rotate with respect to outer race 146 as sprocket is rotated by motor 54 during elevation of bin 30 along track system 24, through engagement of sprocket 136 with chains 72. Plate 140 and sprocket 150 each include a key way 156, 158 which allow them to be keyed to shaft 68.

Figure 7:
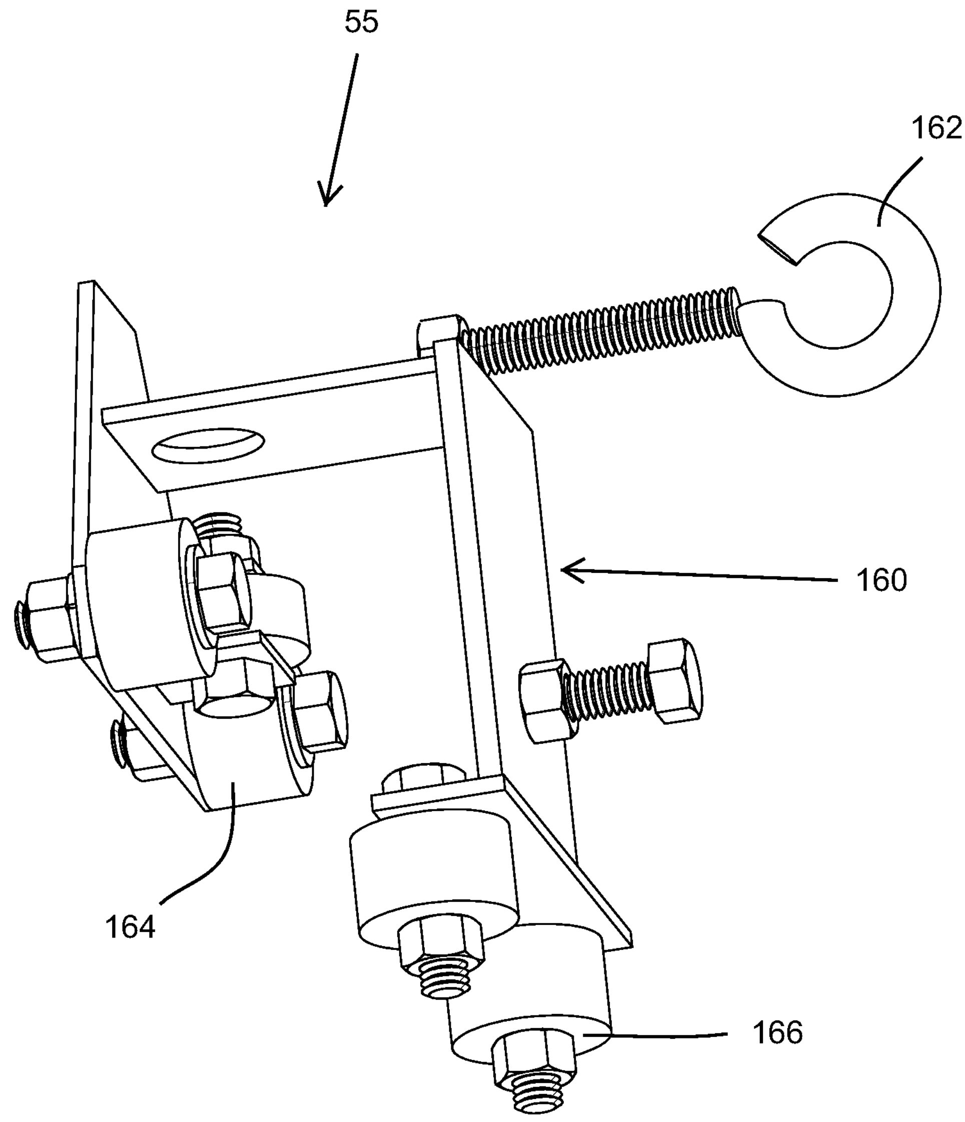
FIG. 7 is a perspective view of a cable hanger used in one embodiment of a material handling system of the present invention.
Figure 8:
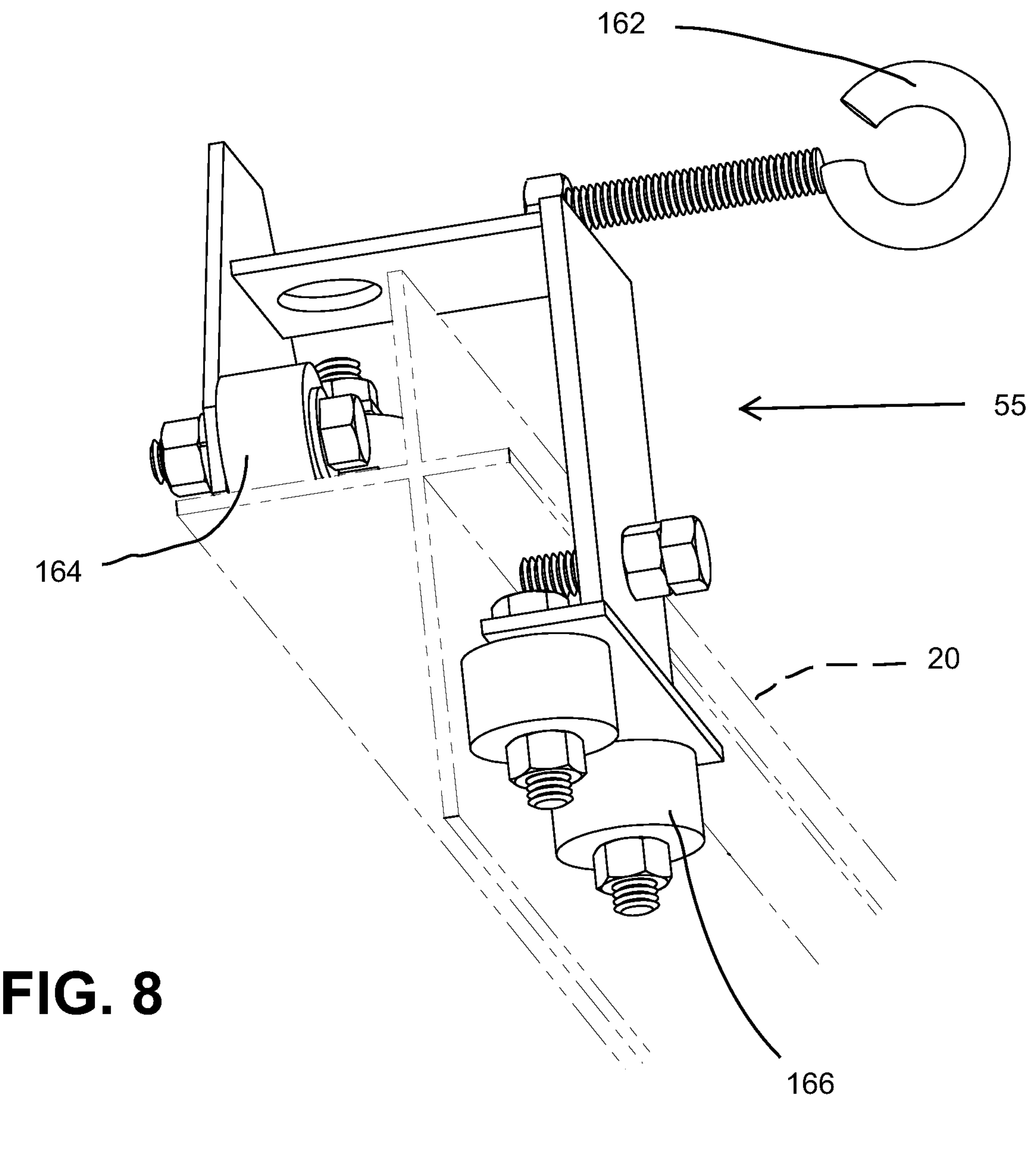
FIG. 8 is a perspective view of the cable hanger illustrated in FIG. 7 used in one embodiment of a material handling system of the present invention.

FIG. 7 shows cable hanger 55, discussed above in further detail. Hanger 55 is slidingly attached to rail 20 on dump bed B, and supports cable 52, as track system 24 and bin 30 are moved back and forth along the length of box B, to, for example, uniformly fill box B with material, such as yard waste, bulk materials, etc. Hanger 55 includes a framework, generally 160, which includes a hook or eyebolt 162 for engaging and carrying resilient member, such as coil spring 56, which in turn has the ends thereof connected to cable 52. Rollers 164, 166 engage rail 20, as shown in FIG. 8, to secure spring 56, and accordingly cable 50, as cable 50 moves to and fro in a bidirectional lateral movement along box B correspondingly with track system 24 and bin 30 when such are adjusted.

Figure 9A:
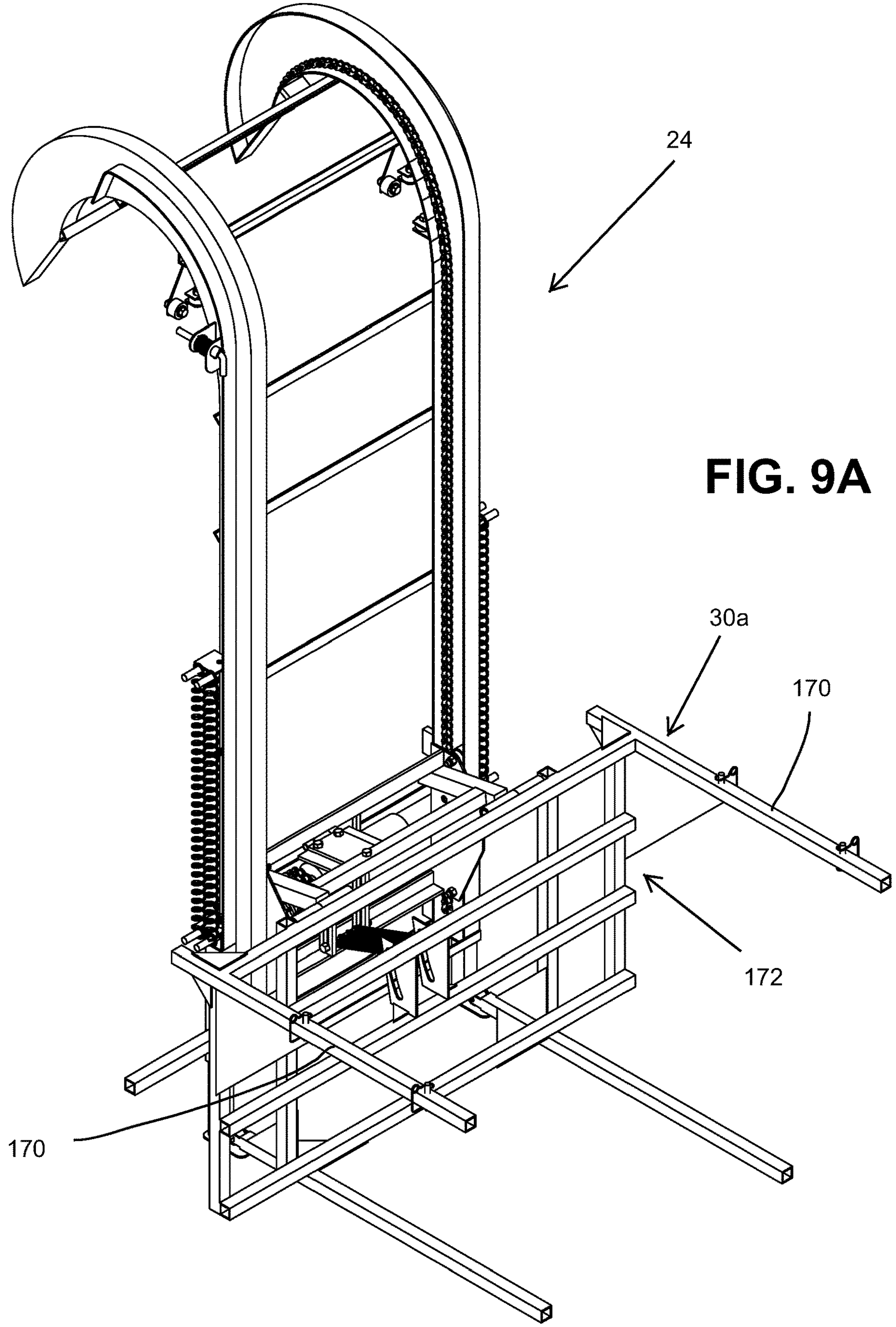
FIGS. 9A through 9C are perspective views of another assembly of an embodiment of a material handling system of the present invention, illustrating an open frame arrangement moving from a starting position to a dumping position.
Figure 9B:
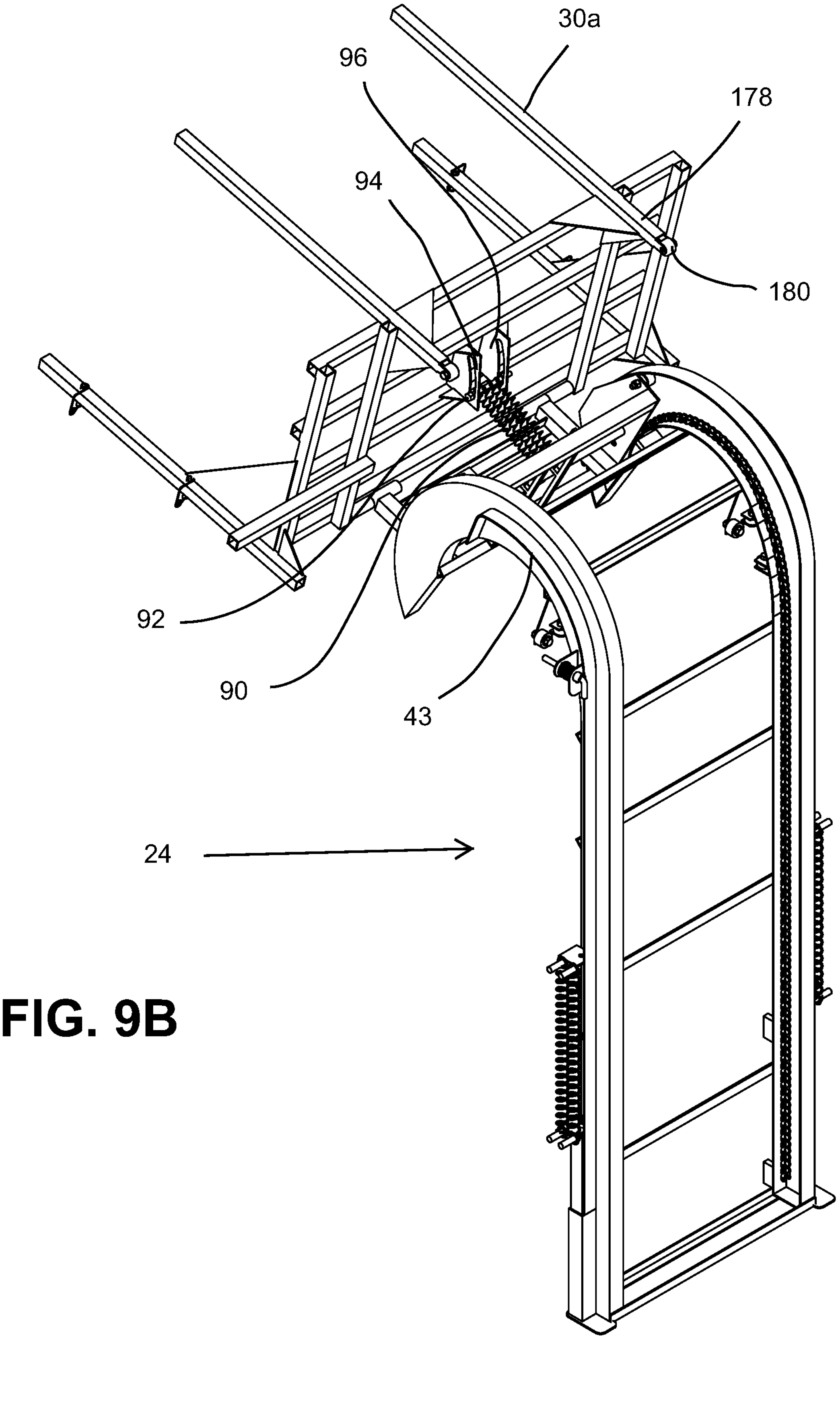
Figure 9C:
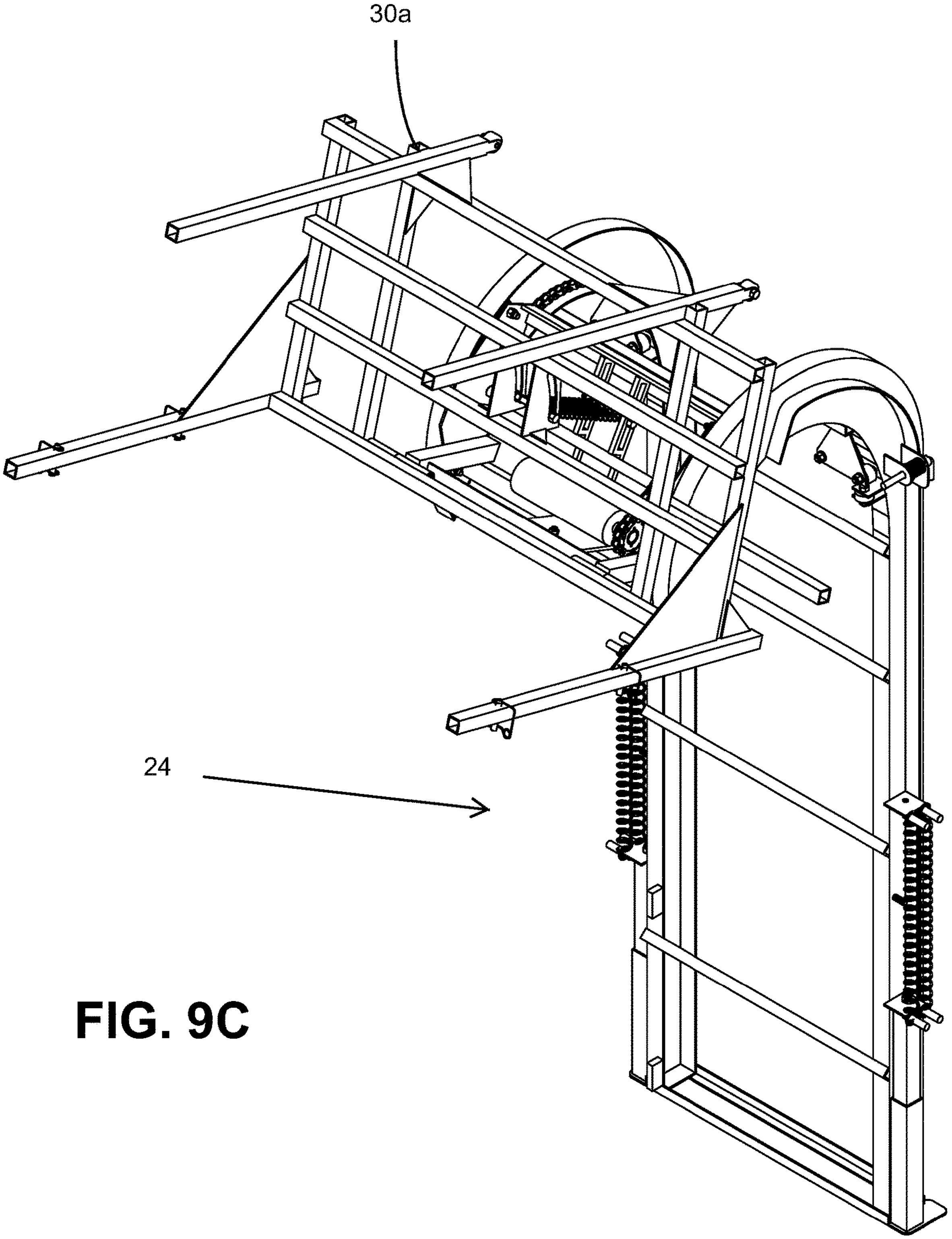

FIGS. 9A through 9C illustrate an alternate embodiment of dump system 10 constructed in accordance with the present invention, which includes a holder such as a bin 30 or a framework, generally 30A, which can be used as a forklift-type and/or box-like arrangement to receive and hold bins and other receptacles (not shown), or other items or devices which are then elevated, and inverted, and returned to a lowermost position, as shown in FIGS. 9A through 9C. Note that framework 30A includes outwardly extending arms 170 and a rear section, generally 172. Such framework 30A includes arm extensions 178 having rollers 180, similar to rollers 42 and arms 44 discussed above in connection with bin 30. Otherwise, the embodiment shown in FIGS. 9A through 9C operates in a similar fashion as does invention 10 as discussed above. Although now shown, the configuration of the holder such as a bin 30, framework 30A, or other framework (not shown) could be adapted to accommodate a conventional wheel barrel, cart, Gaylord, dumpster, or other container (none shown), if desired.

Arms 170 and rear section 172 can be configured for receiving other receptacles or devices, as necessary, and it is to be understood that such framework is for illustrative purposes only and is not to be construed as limiting the scope of the invention.

Figure 10:
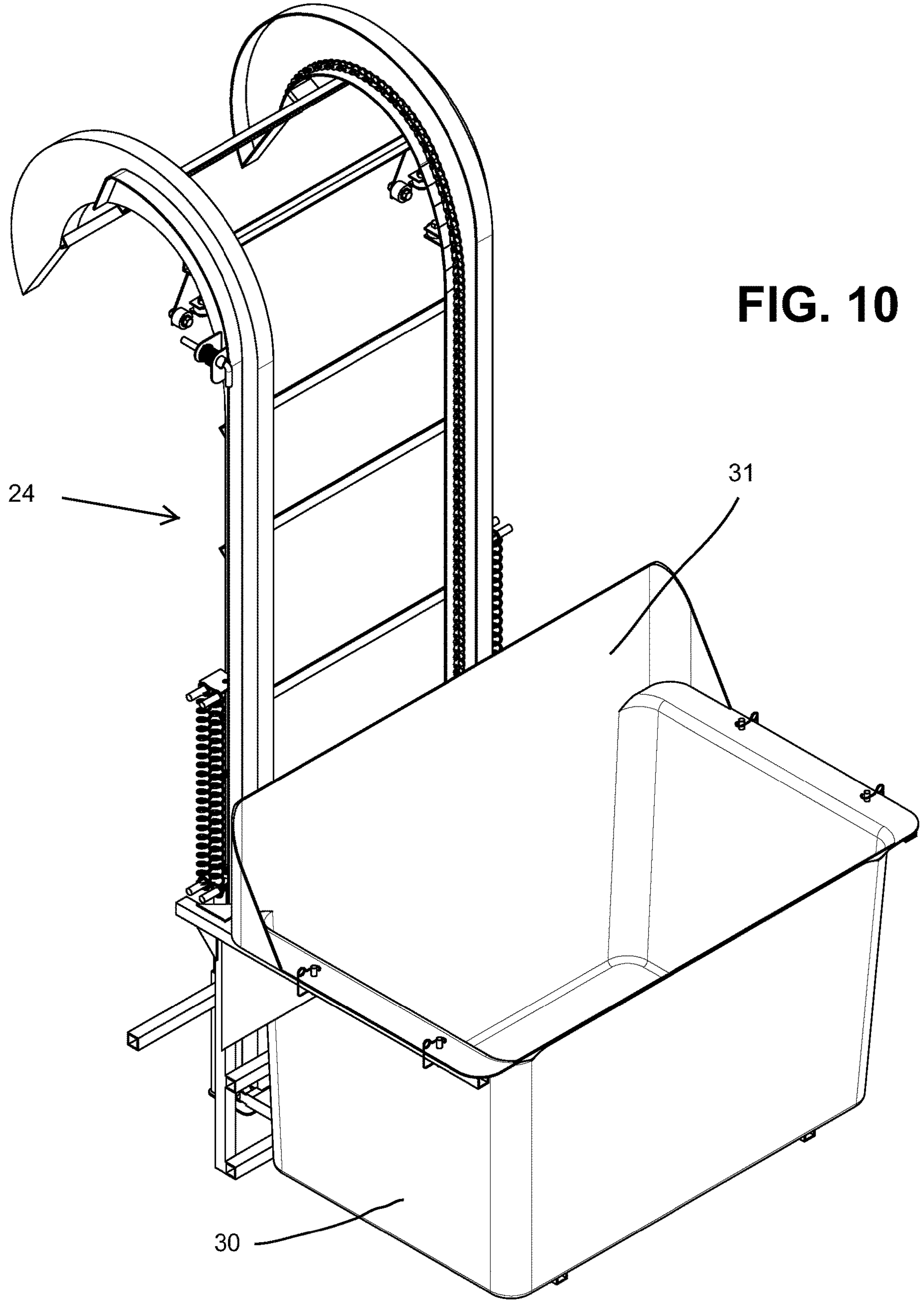
FIG. 10 is a perspective view of a further assembly used in one embodiment of a material handling system of the present invention and includes a holder, namely, a bin, having a chute connected thereto.

FIG. 10 illustrates a variation of bin 30, having chute 31 integral therewith, as discussed above.

Figure 11:
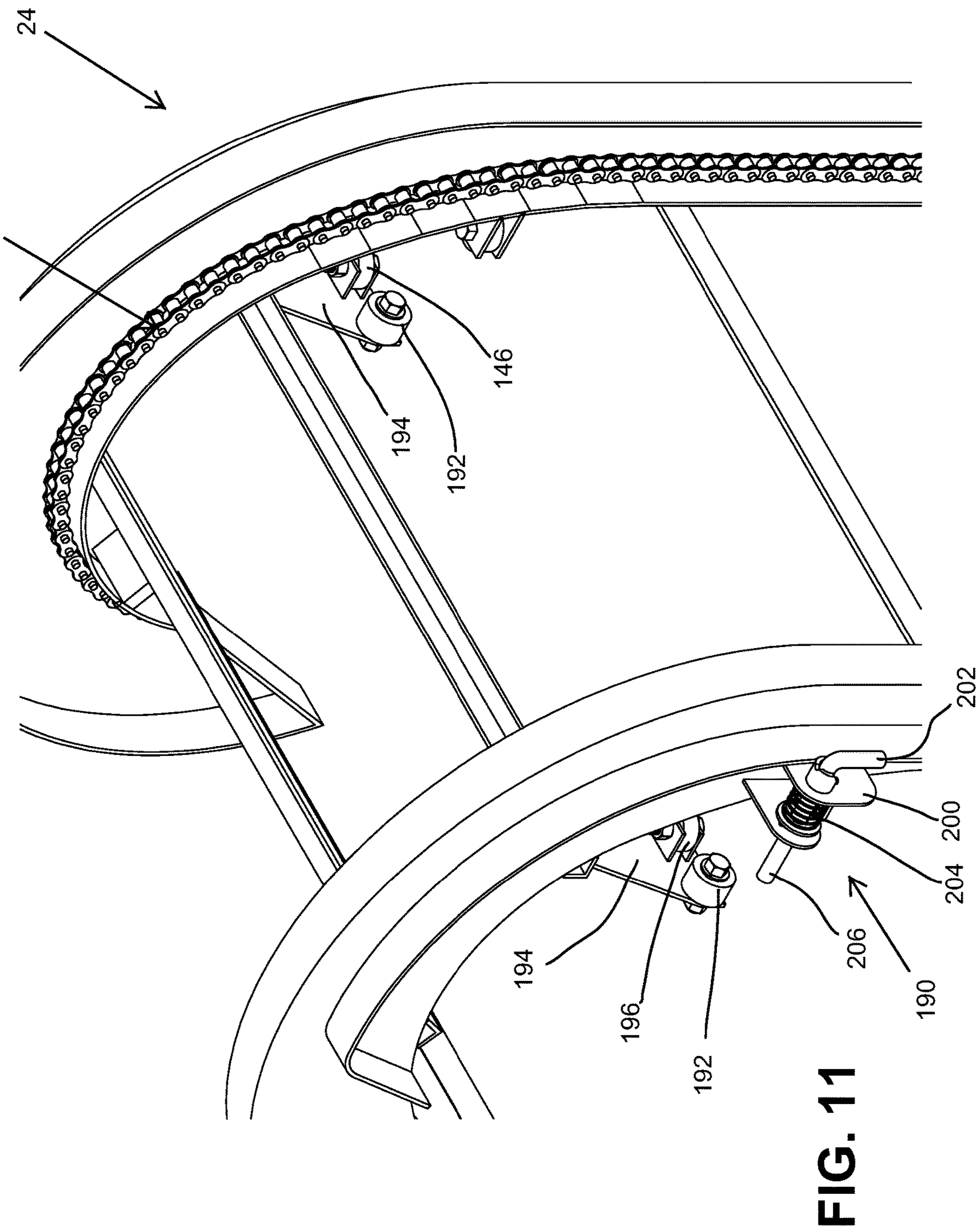
FIG. 11 is a partial perspective view of a track system of one embodiment of a material handling system of the present invention.

FIG. 11 is an enlarged view of track system 24 in the vicinity of the curved upper portion thereof, illustrating a length of chain 72 and also a spring-biased locking pin latch, generally 190, for use in selectively locking track system 24 and, accordingly a holder such as bin 30, to the side of box B, for securing track system 24 during transport and/or movement of truck T. Note also rollers 192 connected to supports 194 which are attached to track system 24, and which facilitate track system 24 moving along rail 20 of truck box B, thereby permitting bidirectional lateral movement. Additional rollers 196 are also attached to support 194 for engaging rail 20, and rollers 197 are attached to track member 32, 34 for engaging rail 22, to facilitate movement of track system 24 thereon.

Note that locking pin assembly may include a bracket, generally 200, having a pin 202 biased by spring 204 and configured such that the free end 206 of pin 202 can engage a hole, slot or other opening (not shown) in truck box B, track 20, or otherwise, to selectively lock track system 24 during transport and/or movement of truck T.

Figure 12:
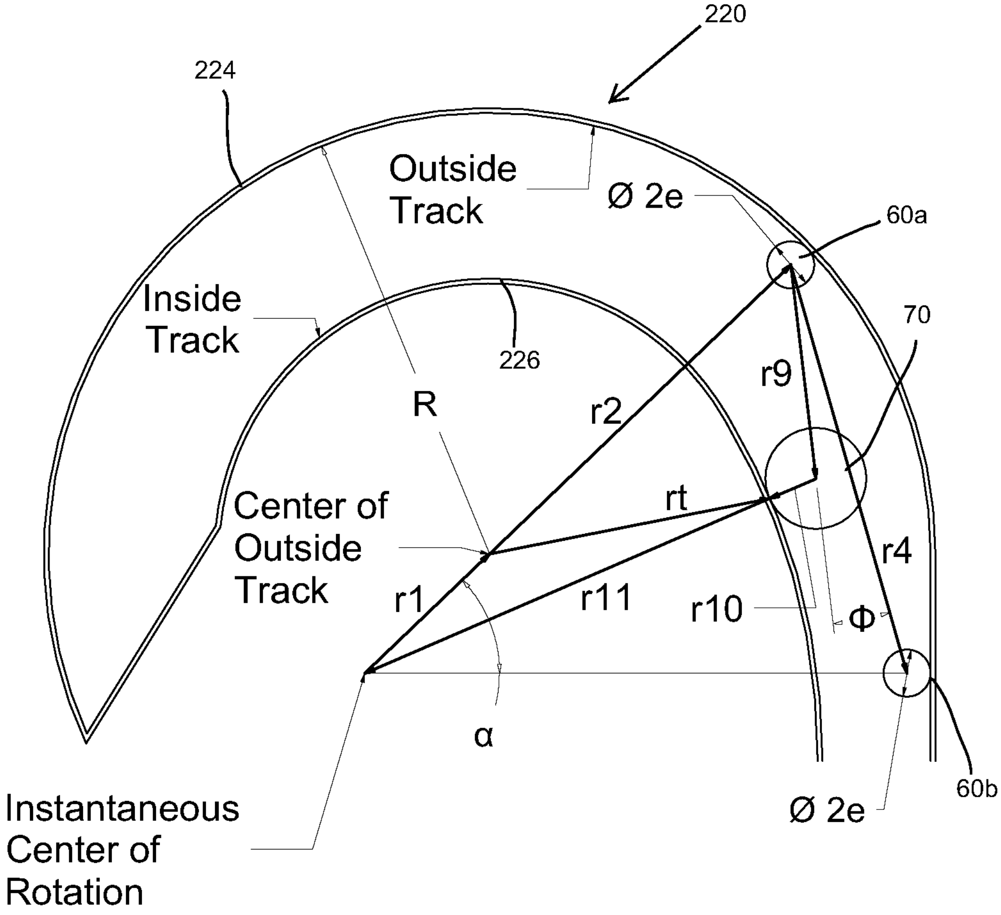
FIG. 12 is a schematic and geometric representation of the configuration of a track of one embodiment of a material handling system of the present invention.
Figure 13:
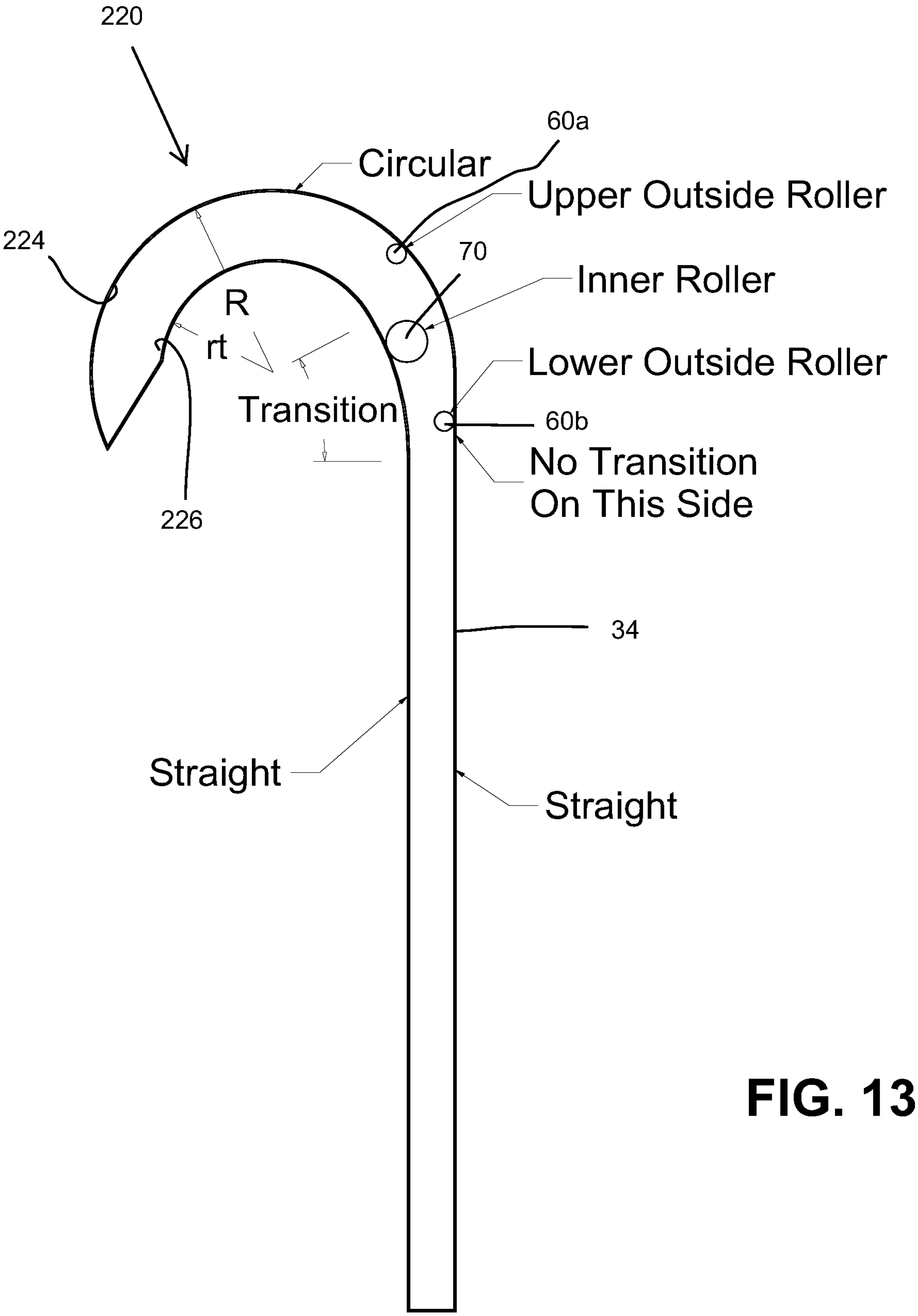
FIG. 13 is a schematic and geometric representation of a track configuration of one embodiment of a material handling system of the present invention.

FIGS. 12 and 13 illustrate schematic representations of the geometry of the upper portion, generally 220, of track members 32, 34 and show the relative positions of rollers 60*a* and 60*b* of carriage 48 as such rollers 60*a*, 60*b* move upwardly through section 220. Also shown is a bearing and sprocket assembly 70 in its position relative to rollers 60*a*, 60*b*. As shown in FIG. 12, the instantaneous center of rotation is identified from which vector r1 and vector r2 are in line with one another and extend to the center of upper roller 60*a*. Also extending from the instantaneous center of rotation are vectors r11 and r10, which are in line with one another, and which extend to the center of bearing and sprocket assembly 70. Vector rt extends between the intersection of vectors r1 and r2 and vectors r11 and r10, and locate the surface of a track member instantaneously being engaged by bearing and sprocket assembly 70. Vector r9 extends from the center of upper roller 68 to the center of bearing and sprocket assembly 70, and vector r4 extends from the center of upper roller 68 to the center of lower roller 60*b*. Vector r1 extends from horizontal at an angle α, and the angle between vectors r9 and r4 is identified as Ø. The diameter of each roller 60*a*, 60*b* is identified as Ø2*e*, and the radius R to the outside track 224 of upper section 220 is identified as vector rt extends from the intersection of vectors r1 and r2. Additionally, vector rt extends from the intersection of vectors r1 and r2 to inside track 226 at the point of contact (tangency) between bearing and sprocket assembly 70 and inside track 226.

Referring to FIG. 13, as carriage 48 moves up the straight, vertical portion of track 34, eventually roller 60*a* will leave the straight portion of the outside track and move onto the curved portion of radius R. Roller 60*a* will move some distance along the curved outside track while lower roller 60*b* remains on the straight, vertical track.

Referring to FIG. 12, during this transition period, where one roller moves in a circle and the other moves in a straight line, the entire carriage 48 appears to rotate about its instantaneous center of rotation, which is itself moving. In this transition period, the inner roller, namely, roller 60*a*, is moving on a path that is neither circular nor straight. If a coordinate system is created with an origin at the center of the circular portions of both the inside and outside tracks, rt is a vector from the origin to the contact point of the inside roller, i.e., bearing and sprocket assembly 70. The shape of the inside track during the transition period can be found by moving carriage 48 in steps and calculating the magnitude and direction of rt at each step.

The steps of the movement of carriage 48 can most easily be managed by varying the angle α, which is the angle between vector r2 and the horizontal. Angle α varies through the range $$0 < \alpha \leq \cos^{-1}\left(1 - \frac{r4^2}{2(R-e)^2}\right)$$

where α is the angle from the horizontal to the center of the upper outside roller 60*a*, e is the radius of the outside rollers 60*a*, 60*b*, and r4 is the distance between the outside rollers, 60*a*, 60*b*. Angle α cannot be zero or below, for this corresponds to the straight section of track below the transition area. For values of angle α greater than the range below, the inside track may be circular with the same center as the outside track and the equations below do not apply. Note that the configuration of rollers 60*a*, 60*b*, and bearing and sprocket assembly 70 are in a triangular relationship with respect to one another.

For each value of angle α, a corresponding vector rt can be found by performing each of the following calculations in the order given. First calculate r1, the magnitude of vector r1, which points from the instantaneous center of rotation to the origin, as $$r1 = e - R + \frac{1}{\sin\alpha}\sqrt{r4^2 - (R-e)^2(1-\cos\alpha)^2}$$

Notice that vectors r1 and r2 are collinear, forming an angle α with horizontal.

Next, calculate the angle of r4, θ4, from its sine and cosine. Angle θ4 is defined as the angle r4 forms with the positive horizontal in the fashion customary for trigonometry. Finding both its sine and cosine permits the angle to be calculated in the correct quadrant.

$$\cos\theta_4 = \frac{(R-e)(1-\cos\alpha)}{r4}$$

$$\sin\theta_4 = \frac{\sin\alpha(e-R-r1)}{r4}$$

FIG. 12 shows two other collinear vectors, r10 and r11, which are both at the angle θ10 from the positive horizontal. The magnitude of vectors r11, r11, and angle θ10 can be found from:

$$r11 = \sqrt{(e-r1-R)^2 + r9^2 - 2(e-r1-R)r9\cos(\alpha - (\theta_4 - \phi))} - r10$$

$$\cos\theta_{10} = \frac{(e-r1-R)\cos\alpha - r9\cos(\theta_4 - \phi)}{r10 + r11}$$

$$\sin\theta_{10} = \frac{(e-r1-R)\sin\alpha - r9\sin(\theta_4 - \phi)}{r10 + r11}$$

Again, care must be taken to calculate the correct quadrant of angle θ10 from its sine and cosine. At this point, there is sufficient information to assemble vectors r2, r9 and r10 using their magnitudes in the directions of the i and j unit vectors:

$$r2 = (R-e)\cos\alpha i + (R-e)\sin\alpha i$$

$$r9 = r9\cos(\theta_4 - \phi)i + r9\sin(\theta_4 - \phi)j$$

$$r10 = r10\cos\theta_{10}i + r10\sin\theta_{10}j$$

Finally, vector rt is the vector sum:

$$rt = r2 + r9 + r10$$

rt, then, is a vector that locates one point on inside track 226 for a given value of angle α. To construct the entire transition region, angle α is varied over the range given above, and a vector rt is calculated for each value of angle α.

Figure 14A:
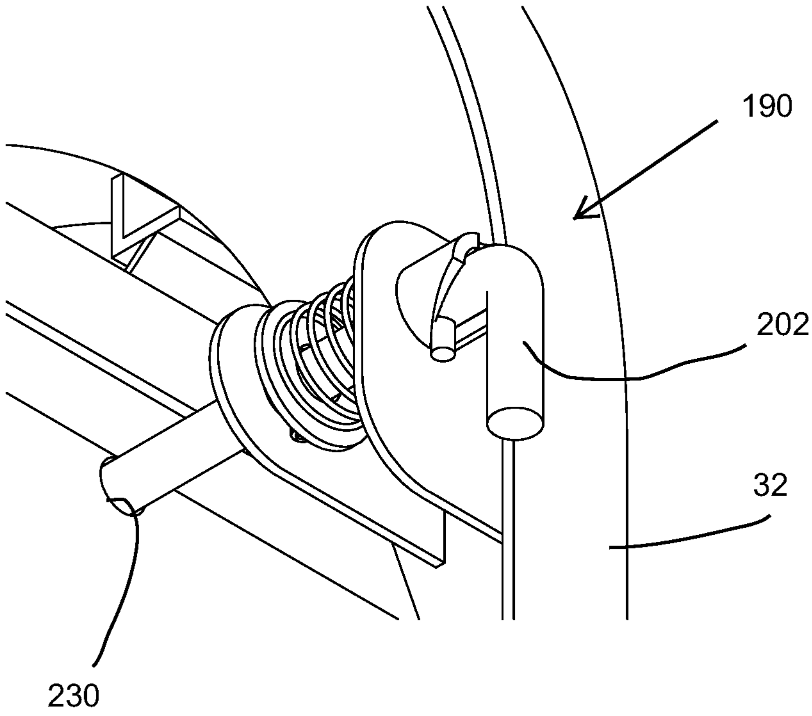
FIGS. 14A and 14B are partial perspective views of a latch device of one embodiment of the present invention.
Figure 14B:
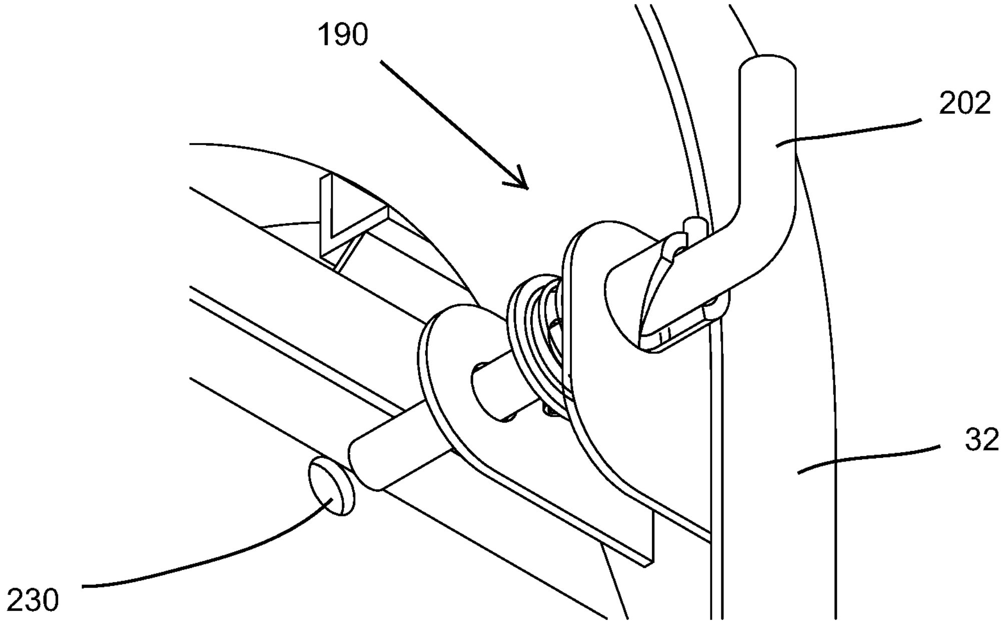

FIGS. 14A and 14B illustrate latch 190, discussed above in relation to FIG. 11. FIG. 14A shows latch 190 in the engaged position, wherein the free end 206 of pin 202 is inserted into hole 230, and FIG. 14B illustrates latch 190 in the disengaged position, wherein the free end 206 of pin 202 is disengaged from hole 230.

Figure 15:
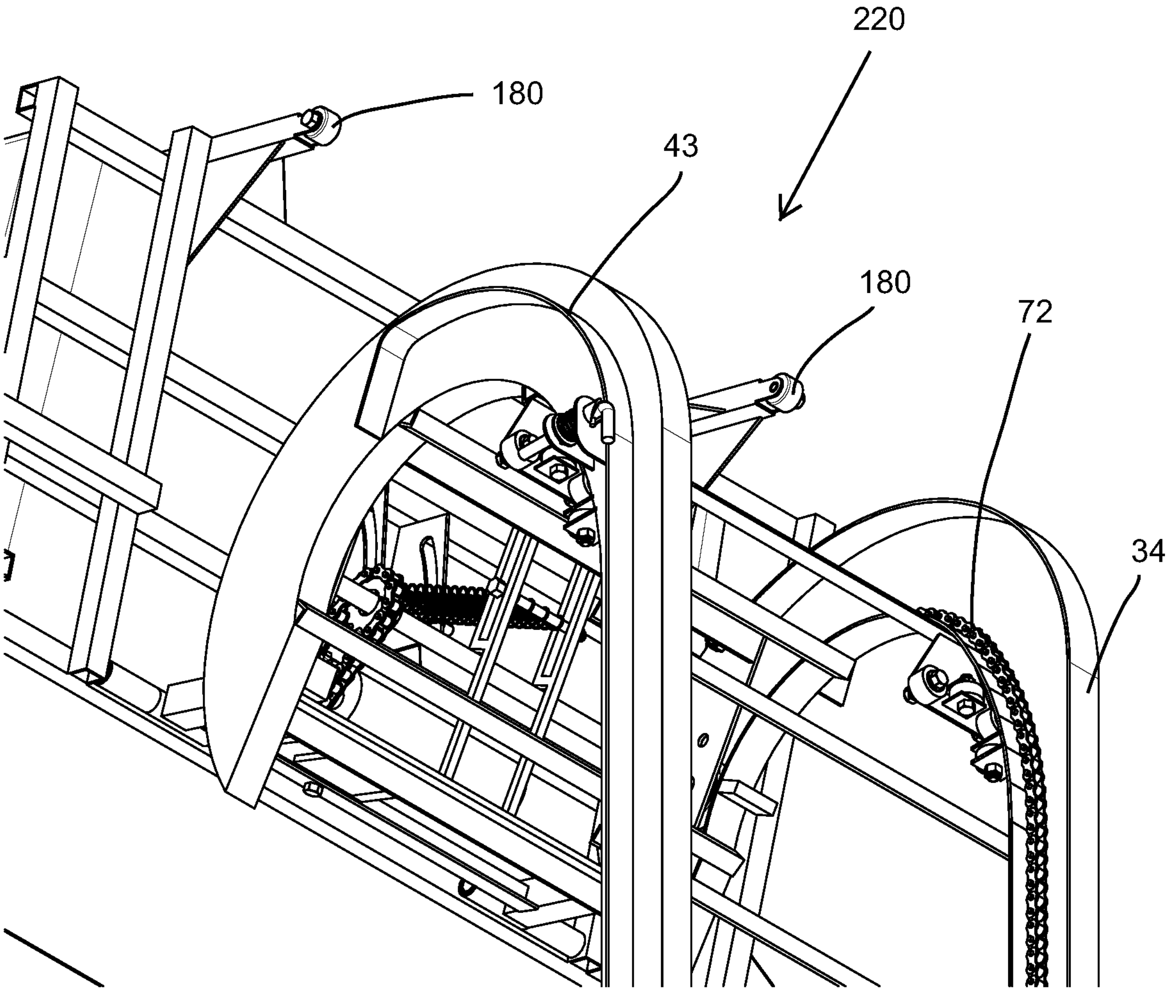
FIG. 15 is a partial perspective view of an assembly of one embodiment of a material handling system of the present invention.
Figure 16:
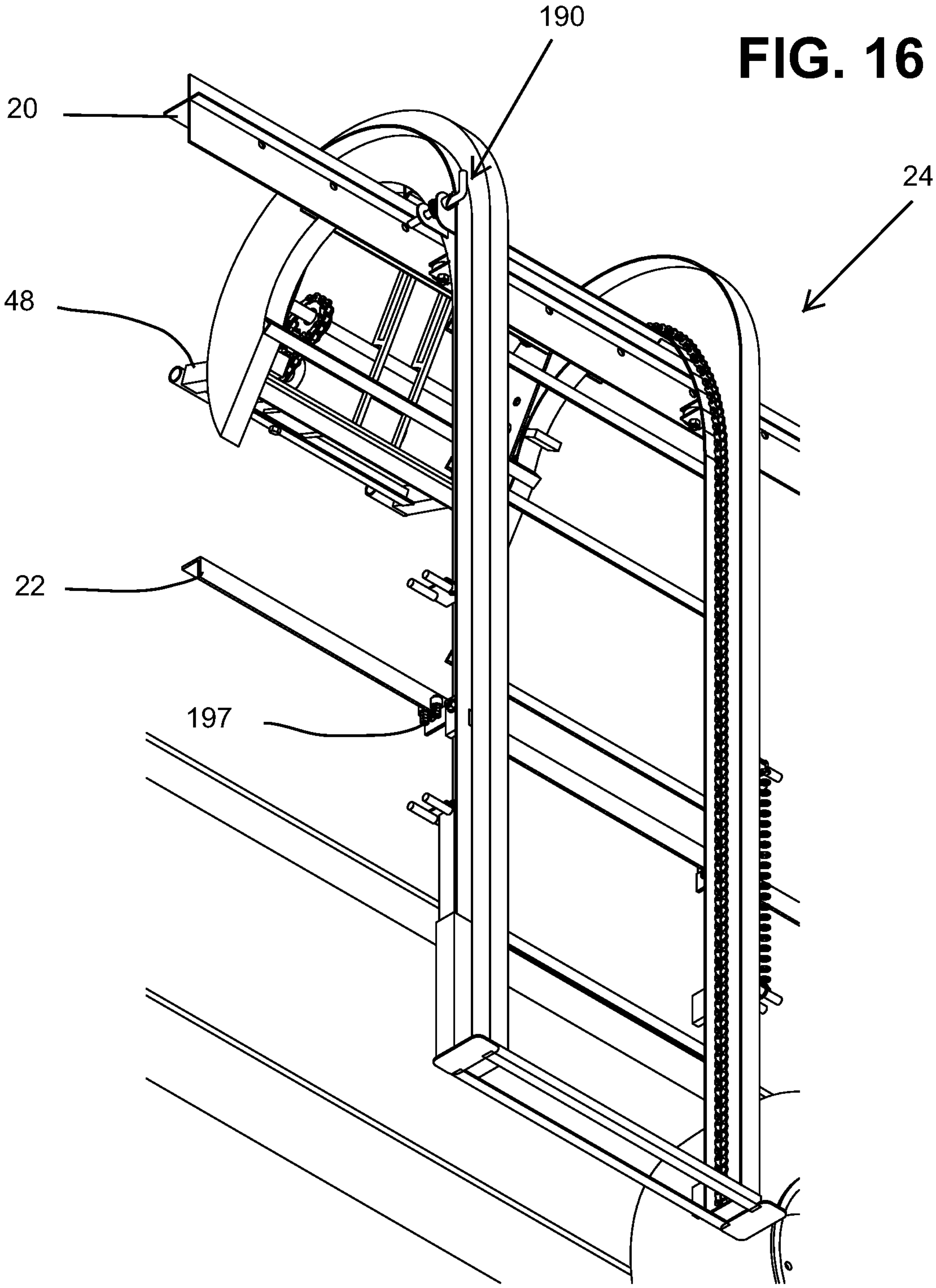
FIG. 16 is a perspective view, with parts removed, of a track system used on one embodiment of a material handling system of the present invention.

FIG. 15 illustrates upper section 220 having exterior tracks 240 on which wheels 180 ride as bin 30*a* moves between the lower most and uppermost or dumping positions.

A material handling, or dump, system constructed in accordance with the present invention may have numerous features, such as the ability to be mounted on and removed from a conventional dump truck. For example, at least one vertical track can be connected to at least one horizontal rails by removable fasteners. Also, such material handling or dump system may present a relatively low profile on the outside of the truck during transport and may, with the holder or bin removed, project outwardly from the side of the dump box B by a minimum amount, such as, perhaps, by only approximately four inches.

A dumping system constructed in accordance with the present invention can receive its electrical power from the power system of the vehicle, such as from the electrical system of truck T and/or could include a self-contained power source, such as one or more batteries, solar panels, etc. (none shown) dedicated operation of a dump system 10, if desired.

While several embodiments have been described in detail herein, it will be apparent to those skilled in the art that the disclosed embodiments may be modified. Therefore, the foregoing description is to be considered exemplary and is not intended to limit the invention to these embodiments. On the contrary, the invention is intended to cover alternatives, modifications and equivalents, which may be included within the spirit and scope of the invention as defined by the appended claims.

Furthermore, in the detailed description of the present invention, numerous specific details are set forth in order to provide a thorough understanding of the present invention. In other instances, well-known methods, procedures, components, and circuits have not been described in detail as not to unnecessarily obscure aspects of the present invention. However, it will be recognized by one of ordinary skill in the art that the present invention may be practiced without these specific details.

What is claimed is:

1. A material handling system for lifting and dumping material, the material handling system comprising:
   at least one generally vertical track defining a generally vertically extending lower portion and a curved upper portion transitioning into the generally vertically extending lower portion;
   a carriage connected to the generally vertical track for movement with respect to the generally vertical track;
   a holder pivotally attached to the carriage; and
   a motive power device operable to raise and lower the carriage along the generally vertical track for moving the holder between an upper position proximate the curved upper portion and a lower position, the holder being in a generally inverted position in the upper position,
   wherein, the holder is configured to pivot with respect to the carriage between a generally upright position upon the holder being in the lower position and a generally inverted position upon the holder being in the upper position.

2. The material handling system of claim 1, further comprising:
   the motive power device being attached to and carried by the carriage during movement of the carriage with respect to the vertical track.

3. The material handling system of claim 1, wherein the holder is rotated greater than about 120 degrees in the upper position relative to the lower position.

4. The material handling system of claim 1, wherein the holder is rotated about 180 degrees in the upper position relative to the lower position.

5. The material handling system of claim 1, further comprising:
   the motive power device being mounted on the carriage;
   a chain fixedly attached to the substantially vertical track, and wherein the motive power device further comprises an output sprocket operable to turn a drive sprocket along the chain.

6. The material handling system of claim 1, wherein the carriage is configured to move the holder between the upper position and the lower position.

7. The material handling system of claim 1, wherein:
   the motive power device further comprises an output sprocket operable to turn a drive sprocket along the chain;
   the generally vertical track defines an inside track and an outside track; and
   the inside track defines a transition region between the vertically extending portion and the curved portion.

8. The material handling system of claim 1 further comprising:
   at least one foot member and at least one channel member, the foot member being slidingly connected to the generally vertical track by the channel member; and
   at least one spring and at least one connector, the spring being connected to the by the at least one connector,
   wherein the spring is operable to upwardly bias the foot member.

9. The material handling system of claim 1 further comprising:
   at least one foot member and at least one channel member, the foot member being slidingly connected to the generally vertical track by the channel member; and
   at least one spring and at least one connector, the spring being connected to the by the at least one connector,
   wherein, the spring is operable to upwardly bias the foot member.

10. A method for lifting and dumping material, the method comprising:
   providing at least one generally vertical track defining a generally vertically extending lower portion and a curved upper portion;
   providing a carriage connected to the generally vertical track for movement with respect to the generally vertical track;
   providing a holder pivotally attached to the carriage;
   providing a motive power device operable to raise and lower the carriage along the generally vertical track and configured for moving the holder between an upper position proximate the curved upper portion and a lower position, the holder being in a generally inverted position in the upper position; and
   using the motive power device, lifting the holder along the generally vertical track from the lower position to the upper position with the motive power device and pivoting the holder along the curved upper portion to substantially invert the holder.

11. A system for lifting and dumping material, the system comprising:
   at least one generally vertical track defining a generally vertically extending lower portion and a curved upper portion transitioning into the generally vertically extending lower portion;
   a carriage connected to the generally vertical track for movement with respect to the generally vertical track;
   a holder pivotally attached to the carriage; and
   a motive power device operable to raise and lower the carriage along the generally vertical track for moving the holder between an upper position proximate the curved portion and a lower position, the holder being in a generally inverted position in the upper position,
   wherein, the holder is configured to pivot with respect to the carriage between a generally upright position upon the holder being in the lower position and a generally inverted position upon the holder being in the upper position.

12. The system of claim 11, further comprising:
   a chain fixedly attached to the substantially vertical track; and
   a motive power device mounted on the carriage and including an output sprocket operable to turn a drive sprocket along the chain,
   wherein, the generally vertical track defines an inside track and an outside track, and the inside track defines a transition region between the vertically extending portion and the curved portion.

13. The material handling system of claim 12, wherein the carriage comprises at least an upper outside roller and a lower outside roller, each of the upper outside roller and lower outside roller defining a radius and being configured to engage the generally vertical track along the outside track.

14. The material handling system of claim 13, wherein the outer track of the curved portion defines a minor arc of a circle, and the movement of the carriage along the curved portion can be described by Equations (1) and (2):

$$0 < \alpha \leq \cos^{-1}\left(1 - \frac{r4^2}{2(R-e)^2}\right), \text{ and} \tag{1}$$

$$r1 = e - R + \frac{1}{\sin\alpha}\sqrt{r4 - (R-e)^2(1-\cos\alpha)^2}, \tag{2}$$

wherein r1 is a vector drawn between an instantaneous center of rotation of the carriage as the carriage moves along the curved portion and a center point of the minor arc defined by the outer track of the curved portion;

α is an angle between a horizontal vector and r1;

r4 is a vector drawn between a center point of the upper outside track roller and a center point of the lower outside track roller;

R is a radius of the minor arc defined by the outer track of the curved portion; and e is the radius of the upper outside roller and lower outside roller.

15. The system of claim 11, further comprising:

a chain fixedly attached to the substantially vertical track; and the motive power device being mounted on the carriage and including an output sprocket operable to turn a drive sprocket along the chain, wherein the generally vertical track defines an inside track and an outside track, and the inside track defines a transition region between the vertically extending portion and the curved portion.

16. The material handling system of claim 15, wherein the carriage comprises at least an upper outside roller and a lower outside roller, each of the upper outside roller and lower outside roller defining a radius and being configured to engage the generally vertical track along the outside track.

17. The material handling system of claim 16, wherein the outer track of the curved portion defines a minor arc of a circle, and the movement of the carriage along the curved portion can be described by Equations (1) and (2):

$$0 < \alpha \leq \cos^{-1}\left(1 - \frac{r4^2}{2(R-e)^2}\right), \text{ and} \tag{1}$$

$$r1 = e - R + \frac{1}{\sin\alpha}\sqrt{r4 - (R-e)^2(1-\cos\alpha)^2}, \tag{2}$$

wherein r1 is a vector drawn between an instantaneous center of rotation of the carriage as the carriage moves along the curved portion and a center point of the minor arc defined by the outer track of the curved portion;

α is an angle between a horizontal vector and r1;

r4 is a vector drawn between a center point of the upper outside track roller and a center point of the lower outside track roller;

R is a radius of the minor arc defined by the outer track of the curved portion; and e is the radius of the upper outside roller and lower outside roller.

* * * * *